United States Patent
Inam et al.

(10) Patent No.: US 11,102,639 B2
(45) Date of Patent: Aug. 24, 2021

(54) METHOD AND DEVICE FOR FACILITATING HANDLING CONTENT IN AN INFORMATION CENTRIC NETWORK (ICN)

(71) Applicant: Telefonaktiebolaget LM Ericsson (publ), Stockholm (SE)

(72) Inventors: Rafia Inam, Västerås (SE); Neiva Lindqvist, Stockholm (SE); Ioanna Pappa, Stockholm (SE); Maxim Teslenko, Sollentuna (SE); Konstantinos Vandikas, Solna (SE); Aneta Vulgarakis Feljan, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 153 days.

(21) Appl. No.: 16/464,165

(22) PCT Filed: Nov. 24, 2016

(86) PCT No.: PCT/EP2016/078734
§ 371 (c)(1),
(2) Date: May 24, 2019

(87) PCT Pub. No.: WO2018/095531
PCT Pub. Date: May 31, 2018

(65) Prior Publication Data
US 2020/0296570 A1 Sep. 17, 2020

(51) Int. Cl.
*H04W 8/08* (2009.01)
*H04L 29/08* (2006.01)
*H04W 64/00* (2009.01)

(52) U.S. Cl.
CPC ............ *H04W 8/08* (2013.01); *H04L 67/327* (2013.01); *H04W 64/003* (2013.01)

(58) Field of Classification Search
CPC ............ H04L 67/2842; H04L 67/2847; H04L 67/327; H04L 67/325; H04W 64/003;
(Continued)

(56) References Cited

U.S. PATENT DOCUMENTS

| 2011/0280214 A1* | 11/2011 | Lee | ........................ H04L 67/327 370/331 |
| 2012/0117240 A1* | 5/2012 | Omar | ..................... H04W 4/021 709/226 |

(Continued)

OTHER PUBLICATIONS

European Communication pursuant to Article 94(3) EPC dated May 20, 2020 issued in European Application No. 16801453.8. (12 pages).

(Continued)

*Primary Examiner* — Mewale A Ambaye
(74) *Attorney, Agent, or Firm* — Rothwell, Figg, Ernst & Manbeck, P.C.

(57) ABSTRACT

Method performed by a first network node (111) for handling content in an Information-Centric Network (ICN). The first network node (111) operates in a wireless communications network (100). The first network node (111) obtains (502) an indication about one or more network nodes (130) where a request for a content by a wireless device (151) operating in the wireless communications network (100) is predicted to be received in one or more future time periods. The one or more network nodes (130) operate in the wireless communications network (100) supporting ICN. The first network node (111) then initiates instructing (503) at least a subset of the one or more network nodes (130) to obtain the content prior to the one or more future time periods. Also described are a second network node (112), a third network node (133), and the wireless device (151), for facilitating handling the content in the ICN.

17 Claims, 14 Drawing Sheets

(58) Field of Classification Search
CPC ............... H04W 8/08; H04W 36/0016; H04W 36/0033; H04W 36/0055; H04W 36/026; H04W 4/18; H04W 76/40; H04W 8/00; H04W 8/02; H04W 64/00
See application file for complete search history.

(56) References Cited

U.S. PATENT DOCUMENTS

| | | | |
|---|---|---|---|
| 2013/0039249 A1* | 2/2013 | Ravindran | H04W 36/026 370/312 |
| 2013/0337831 A1* | 12/2013 | Edge | G01S 5/0205 455/456.1 |
| 2014/0112307 A1 | 4/2014 | Kim et al. | |
| 2014/0189060 A1* | 7/2014 | Westphal | H04L 67/327 709/217 |
| 2016/0366620 A1* | 12/2016 | Royon | H04L 67/10 |
| 2019/0141516 A1* | 5/2019 | Ekambaram | H04L 67/327 |
| 2020/0259885 A1* | 8/2020 | Alam | G06F 9/5027 |

OTHER PUBLICATIONS

Siris, V. et al., "A Selective Neighbor Caching Approach for Supporting Mobility in Publish/Subscribe Networks", Proceedings of the 2004 IEEE International Conference on Mobile Data Management, XP-002690920, (2004). (17 pages).

Burcea, I. et al., "Disconnected Operation in Publish/Subscribe Middleware", 5th IEEE International Conference on Mobile Data Management, (Jan. 2004). (12 pages).

International Search Report and Written Opinion dated Sep. 14, 2017 issued in International Application No. (24 pages) PCT/EP2016/078734. (24 pages).

* cited by examiner

METHOD AND DEVICE FOR FACILITATING HANDLING CONTENT IN AN INFORMATION CENTRIC NETWORK (ICN)

CROSS REFERENCE TO RELATED APPLICATION(S)

This application is a 35 U.S.C. § 371 National Stage of International Patent Application No. PCT/EP2016/078734, filed Nov. 24, 2016, designating the United States.

TECHNICAL FIELD

The present disclosure relates generally to a first network node and methods performed thereby for handling content in an Information-Centric Network (ICN). The present disclosure also relates generally to a second network node, a third network node, and a wireless device, and methods performed thereby, each for facilitating handling content in the ICN. The present disclosure further relates generally to a computer program product, comprising instructions to carry out the actions described herein, as performed by the first network node, the second network node, the third network node, or the wireless device. The computer program product may be stored on a computer-readable storage medium.

BACKGROUND

Wireless devices within a wireless communications network may be e.g., User Equipments (UE), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams.

In the context of this disclosure, the expression Downlink (DL) is used for the transmission path from the base station to the wireless device. The expression Uplink (UL) is used for the transmission path in the opposite direction i.e., from the wireless device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Information-centric Networking (ICN), Content Centric Networking (CCN), Named Data Networking (NDN)

Information Centric Networking (ICN) is a new networking paradigm. Information about ICN may be found on https://irtf.org/icnrg. Content Centric Networking (CCN) is one approach within the ICN paradigm. More information about CCN may be found on ccnx.org. Instead of focusing on connecting communicating endpoints, as traditional networking protocols, such as the Internet Protocol (IP), do, these new paradigms focus on the information, known as the "Content Object" that should be retrieved. A Content object in ICN may be understood as a content a user requests, that is units of data that may have a Publisher-given Name. The name may be used to identify the correct Content Object when it is found. Examples of an object are: a movie, a song, a file, an application, etc . . . . In ICN, networking messages may be routed based on the globally unique names of content objects rather than on endpoint addresses referring to physical boxes.

In CCN, a Content Object may be retrieved by issuing a so-called "Interest message" to the network containing the unique name of the Content Object. Such a message may be routed by the network towards the source or publisher of the object. CCN Nodes along the path between the node forwarding the interest message and the source node of the Content Object, which may be referred to as routers, may check if they have a cached copy of the object in a so called Content Store (CS), a buffer where a copy, e.g., cached, of Content Objects may be kept for potential reuse. If so, they will respond to the Interest message with a Data message containing the requested Content Object, and the Interest message will not be propagated any further. The routing may be helped by the name being a structured name, that is, a name similar to domain names, but with richer syntax. Routers may maintain a table known as a Forwarding Information Base (FIB) about where, that is, which interface or "face", as it is called in ICN, to forward which name or name prefix. The FIB may be used to forward an Interest message in its search for Content Objects. A name prefix may be understood herein to refer to an identifier of the content. The routers along the path of the Interest message may keep a record of the Interest messages they have forwarded and which are still pending, which may comprise the face where it came from and what Content Object it was naming, in their so-called Pending Interest Table (PIT). If other Interest messages to the same name, that is, for the same Content Object, arrive to the router, it may not forward them, but just note them in the PIT besides the entry for this name, in a process called Interest aggregation. This way the PIT entries for the same name may form a tree in the network with receivers at the leaves, indicating which receivers have requested a particular Content Object. FIG. 1 is a schematic diagram illustrating an overview of an example of a CCN node, as obtained from http://security.r- iit.tsinqhua.edu.cn/mediawiki/imaqes/5/53/CCNx-Keynote_Edens.pdf. The FIB, PIT and CS are represented, as just described. Faces 1, 2 and 3 represent interfaces to other ICN network nodes.

FIG. 2 is a schematic diagram illustrating various aspects of CCN/ICN including prefix routing, caching at ICN/CCN nodes (CS), and optimized delivery of cached objects. Panel A of FIG. 2 schematically shows a user 201 of an ICN network 202. The ICN network comprises a node 203 having a particular Content Object 204, in this example a video, represented in the Figure as "/⚹/videos/CES". In Panel B, the user 201 sends an Interest message to the ICN network 202 containing the unique name of the Content Object. In Panel C, the message is routed by the network 202 towards the source or publisher of the object, node 203, along the path marked by the empty arrows as long as the prefix matches, using prefix routing. Each router in the network 202 is represented by a box with crossed arrows. When the Interest message reaches an endpoint, or router, node 203, having a copy of the Content Object, perhaps cached, the Interest message may be responded to with a Data message as shown in Panel D, which may be propagated backwards along the path the Interest message took. The CCN Nodes along the path may optionally keep a cached copy of the object in their respective CS, indicated in one router as copy 205. The backward path may be learned from the entries the Interest message left in the PIT of the routers along the path. If there were multiple Interests arriving at a router for this name, the Data message containing the Content Object may be replicated towards each respective face/direction, where the Interest messages came from. After forwarding a Content Object matching a pending Interest, the routers may delete the corresponding entry in the PIT, thus these entries may be expected to be short-lived. When the original endpoint(s) generating the Interest message(s) receive the Content Object, the transaction may be considered closed. One benefit of ICN may be in distributing the same information to multiple places in the network. Since routers may cache Content Objects besides forwarding them, Content Objects may need not traverse the entire network every time someone becomes interested in them—a local cached copy may suffice. This is represented in Panel E, where a new user 206 sends an Interest message for the same Content Object as the first user 201. The nearest node to the new user 206 may be able to readily provide its own stored copy of the Content Object. Similarly, as depicted in Panel F, if the new user 206 moves and is served by a different node in the network 202, and this new serving node also has a copy of the Content Object, it may readily provide that to the new user 206, upon request.

The request aggregation mechanism described earlier may be understood to form a hierarchical tree in the ICN network where request packets may be aggregated, and response packets may be deaggregated at each level of the tree. This may allow ICN networks to scale with increasing number of clients.

Another advantage with ICN may be the aggregation of Interest messages, in the case of a flash crowd event, where suddenly thousands of endpoints may be requesting the same content. In such an event, the source may only be reached by one request for the content, all other requests may then be served from the caches of routers along the path towards the source.

In current ICN networks, the mobility of a user may significantly delay the delivery of the content it has requested, as routing of the requested content to a new serving node in the new location may result in considerable usage of time and processing resources, negatively impacting the performance of the network, and the experience of the user.

SUMMARY

It is an object of embodiments herein to improve the handling of content in an ICN.

According to a first aspect of embodiments herein, the object is achieved by a method performed by a first network node. The method is for handling content in an ICN. The first network node operates in a wireless communications network. The first network node obtains an indication about one or more network nodes where a request for a content by a wireless device operating in the wireless communications network is predicted to be received in one or more future time periods. The one or more network nodes operate in the wireless communications network supporting ICN. The first network node then initiates instructing at least a subset of the one or more network nodes to obtain the content prior to the one or more future time periods.

According to a second aspect of embodiments herein, the object is achieved by a method performed by a second network node. The method is for facilitating handling content in an ICN. The second network node operates in the wireless communications network. The second network node obtains one or more groups of wireless devices operating in the wireless communications network, based on first information about the wireless devices. The second network node obtains the indication about the one or more network nodes where the request for the content by the wireless device comprised in the one or more groups of wireless devices is predicted to be received in the one or more future time periods. The obtaining the indication about the one or more network nodes is based on the obtained one or more groups. The one or more network nodes operate in the wireless communications network supporting ICN. The second network node then initiates sending the obtained indication about the one or more network nodes to the first network node operating in the wireless communications network.

According to a third aspect of embodiments herein, the object is achieved by a method performed by a third network node. The method is for facilitating handling content in an ICN. The third network node operates in the wireless communications network. The third network node obtains a determination of whether or not a second information is comprised in a request for a content received from the wireless device operating in the wireless communications network. The second information is based on a location of the wireless device. The second information is valid. The third network node then adds valid second information to the request for the content received from the wireless device if the second information is determined to not be comprised in the request, or if the second information comprised in the request is determined to not be valid. Finally, the third network node initiates sending the request with the valid second information, to the second network node operating in the wireless communications network.

According to a fourth aspect of embodiments herein, the object is achieved by a method performed by a wireless device. The method is for facilitating handling content in an ICN. The wireless device operates in the wireless communications network. The wireless device sends the indication to a network node operating in the wireless communications network. The indication is about the one or more network nodes where the request for the content by the wireless device is predicted to be received in the one or more future time periods. The one or more network nodes operate in the wireless communications network supporting ICN.

According to a fifth aspect of embodiments herein, the object is achieved by a first network node for handling content in an ICN. The first network node is configured to operate in the wireless communications network. The first network node is further configured to obtain the indication about the one or more network nodes where the request for the content by the wireless device operating in the wireless communications network is predicted to be received in the one or more future time periods. The one or more network nodes are configured to operate in the wireless communications network supporting ICN. The first network node is further configured to initiate instructing at least the subset of the one or more network nodes to obtain the content prior to the one or more future time periods.

According to a sixth aspect of embodiments herein, the object is achieved by a second network node for facilitating handling content in an ICN. The second network node is configured to operate in the wireless communications network. The second network node is further configured to obtain the one or more groups of wireless devices configured to operate in the wireless communications network, based on the first information about the wireless devices. The second network node is also configured to obtain the indication about the one or more network nodes where the request the content by the wireless device comprised in the one or more groups of wireless devices is predicted to be received in the one or more future time periods. To obtain the indication about the one or more network nodes is configured to be based on the obtained one or more groups. The one or more network nodes are configured to operate in the wireless communications network supporting ICN. The second network node is further configured to initiate sending the obtained indication about the one or more network nodes to the first network node configured to operate in the wireless communications network.

According to a seventh aspect of embodiments herein, the object is achieved by a third network node for facilitating handling content in an ICN. The third network node is configured to operate in the wireless communications network. The third network node is further configured to obtain the determination of whether or not the second information is comprised in the request for the content received from the wireless device configured to operate in the wireless communications network. The second information is configured to be based on a location of the wireless device. The second information is valid. The third network node is also configured to add valid second information to the request for the content configured to be received from the wireless device, if the second information is configured to be determined to not be comprised in the request, or if the second information comprised in the request is configured to be determined to not be valid. Finally, the third network node is further configured to initiate sending the request with the valid second information, to the second network node being configured to operate in the wireless communications network.

According to an eighth aspect of embodiments herein, the object is achieved by a wireless device for facilitating handling content in an ICN. The wireless device is configured to operate in the wireless communications network. The wireless device is further configured to send the indication to the network node configured to operate in the wireless communications network. The indication is about the one or more network nodes where the request for the content by the wireless device is configured to be predicted to be received in the one or more future time periods. The one or more network nodes are configured to operate in the wireless communications network supporting ICN.

According to a ninth aspect of embodiments herein, the object is achieved by a computer program. The computer program comprises instructions which, when executed on at least one processor, cause the at least one processor to carry out the method performed by the first network node.

According to a tenth aspect of embodiments herein, the object is achieved by computer-readable storage medium. The computer-readable storage medium has stored thereon a computer program comprising instructions which, when executed on at least one processor, cause the at least one processor to carry out the method performed by the first network node.

According to an eleventh aspect of embodiments herein, the object is achieved by a computer program. The computer program comprises instructions which, when executed on at least one processor, cause the at least one processor to carry out the method performed by the second network node.

According to a twelfth aspect of embodiments herein, the object is achieved by computer-readable storage medium. The computer-readable storage medium has stored thereon a computer program comprising instructions which, when executed on at least one processor, cause the at least one processor to carry out the method performed by the second network node.

According to a thirteenth aspect of embodiments herein, the object is achieved by a computer program. The computer program comprises instructions which, when executed on at least one processor, cause the at least one processor to carry out the method performed by the third network node.

According to a fourteenth aspect of embodiments herein, the object is achieved by computer-readable storage medium. The computer-readable storage medium has stored thereon a computer program comprising instructions which, when executed on at least one processor, cause the at least one processor to carry out the method performed by the third network node.

According to a fifteenth aspect of embodiments herein, the object is achieved by a computer program. The computer program comprises instructions which, when executed on at least one processor, cause the at least one processor to carry out the method performed by the wireless device.

According to a sixteenth aspect of embodiments herein, the object is achieved by computer-readable storage medium. The computer-readable storage medium has stored thereon a computer program comprising instructions which, when executed on at least one processor, cause the at least one processor to carry out the method performed by the wireless device.

By the first network node obtaining the indication about one or more network nodes, where the request for content from the wireless device is predicted to be received in the future, the first network node enables that the content is fetched and present at the one or more network nodes, prior to the wireless device even sending the request to them. The second network node, the third network node and the wireless device each facilitate the handling on the content by the first network node by performing their respective methods described herein. The second network node may obtain the indication of the one or more network nodes by obtaining the one or more groups of wireless devices and provide the indication to the first network node. The third network node may provide valid location information to the second network node that may be used for generating the one or more groups of wireless devices and the indication of one or more network nodes. The wireless device may itself inform the first network node about the one or more network nodes where it intends to send the request. Ultimately, by the first network node enabling that the content is present at the one or more network nodes, prior to the wireless device sending the request to them, the latency in providing the content to the wireless device upon request is decreased and the performance of the network is improved, which in turn leads to the improved experience of the user.

BRIEF DESCRIPTION OF THE DRAWINGS

Examples of embodiments herein are described in more detail with reference to the accompanying drawings, and according to the following description.

DETAILED DESCRIPTION

As part of the development of embodiments herein, a problem will first be identified and discussed.

Figure 1:
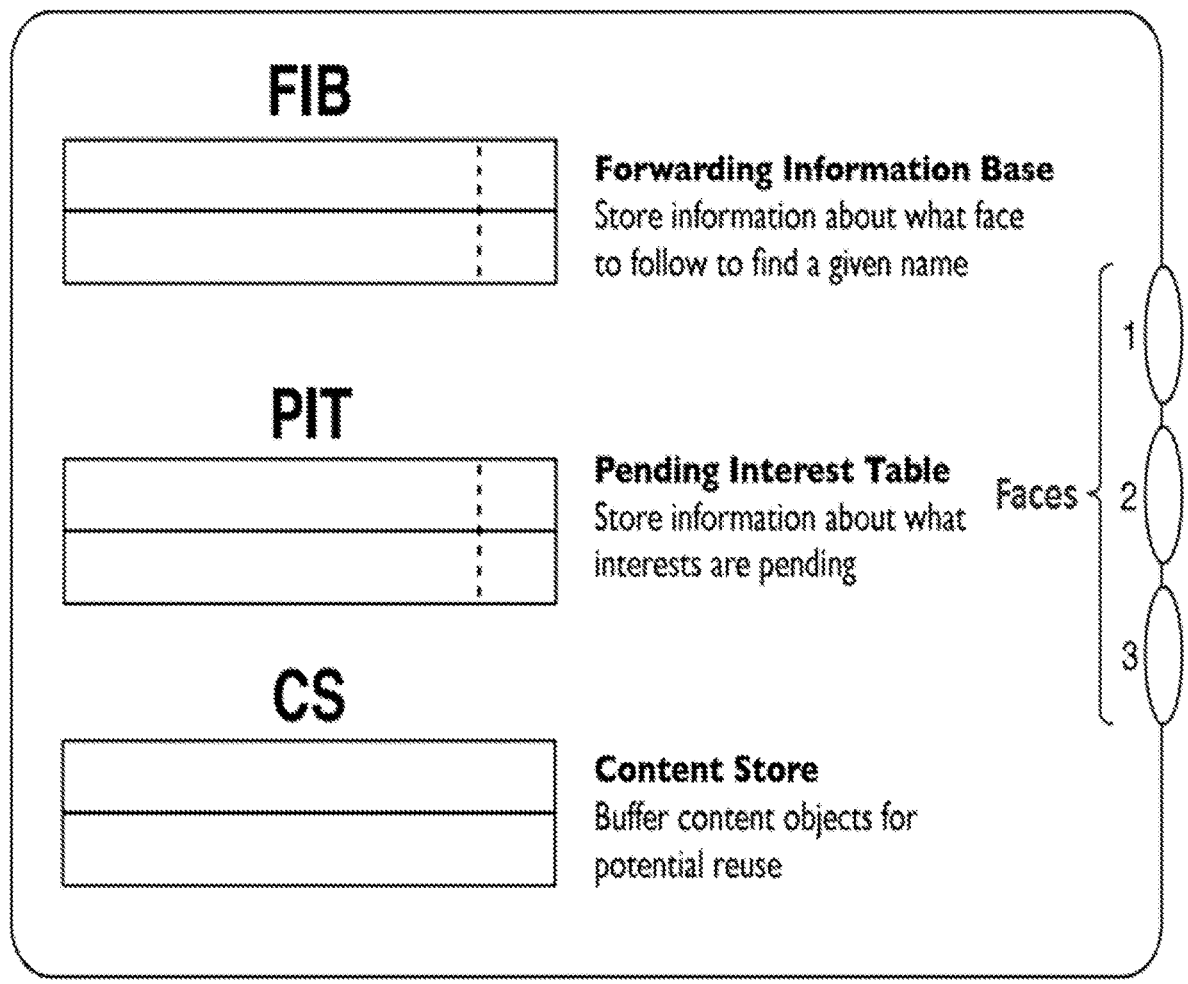
FIG. 1 is a schematic diagram illustrating an overview of a CCN node, according to existing methods.
Figure 2:
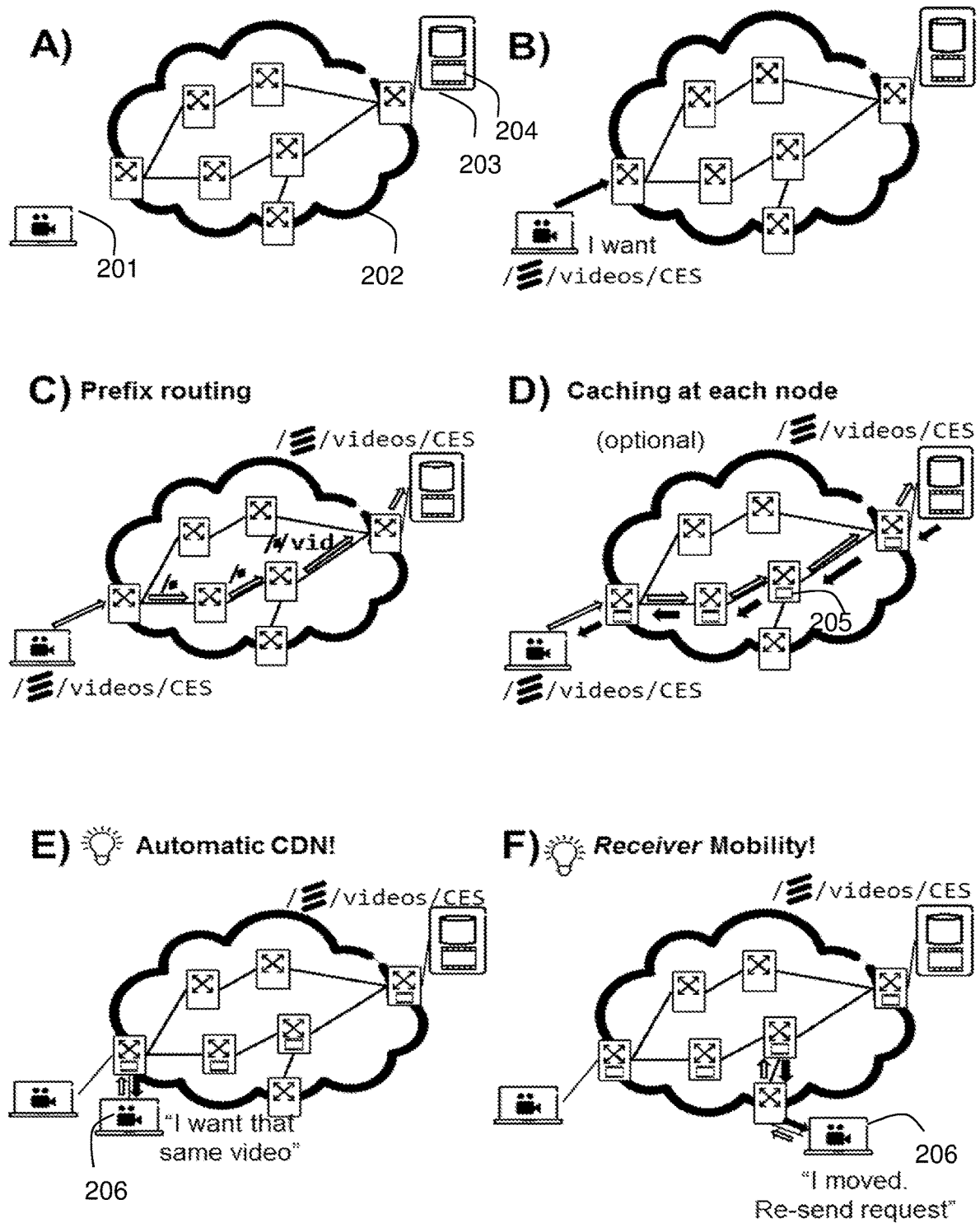
FIG. 2 is a schematic diagram illustrating aspects of CCN/ICN, according to existing methods.

In current ICN networks, as depicted in FIG. 2, the delivery of the content happens when the interest request is made. As shown in panel F of FIG. 2, when one receiver, the new user 206, is moved to another location, that receiver needs to send the interest request again to the network. Its requested content is then cached to the closer node to the receiver, and then delivered to the receiver. If the closest node to the receiver does not have a cache copy of the requested content, previously stored, it may take in some circumstances a long time to obtain the requested content, depending on the number of routers existing between the node closest to the receiver, and the source node of the requested content. Currently, there is no method to pre-cache the requested content in advance. That is, currently, there is no possibility to predict ahead of time what content may need to be delivered in the future and where, to which nodes in the network, the content may need to be delivered, based on a potential mobility of a user.

Figure 3:
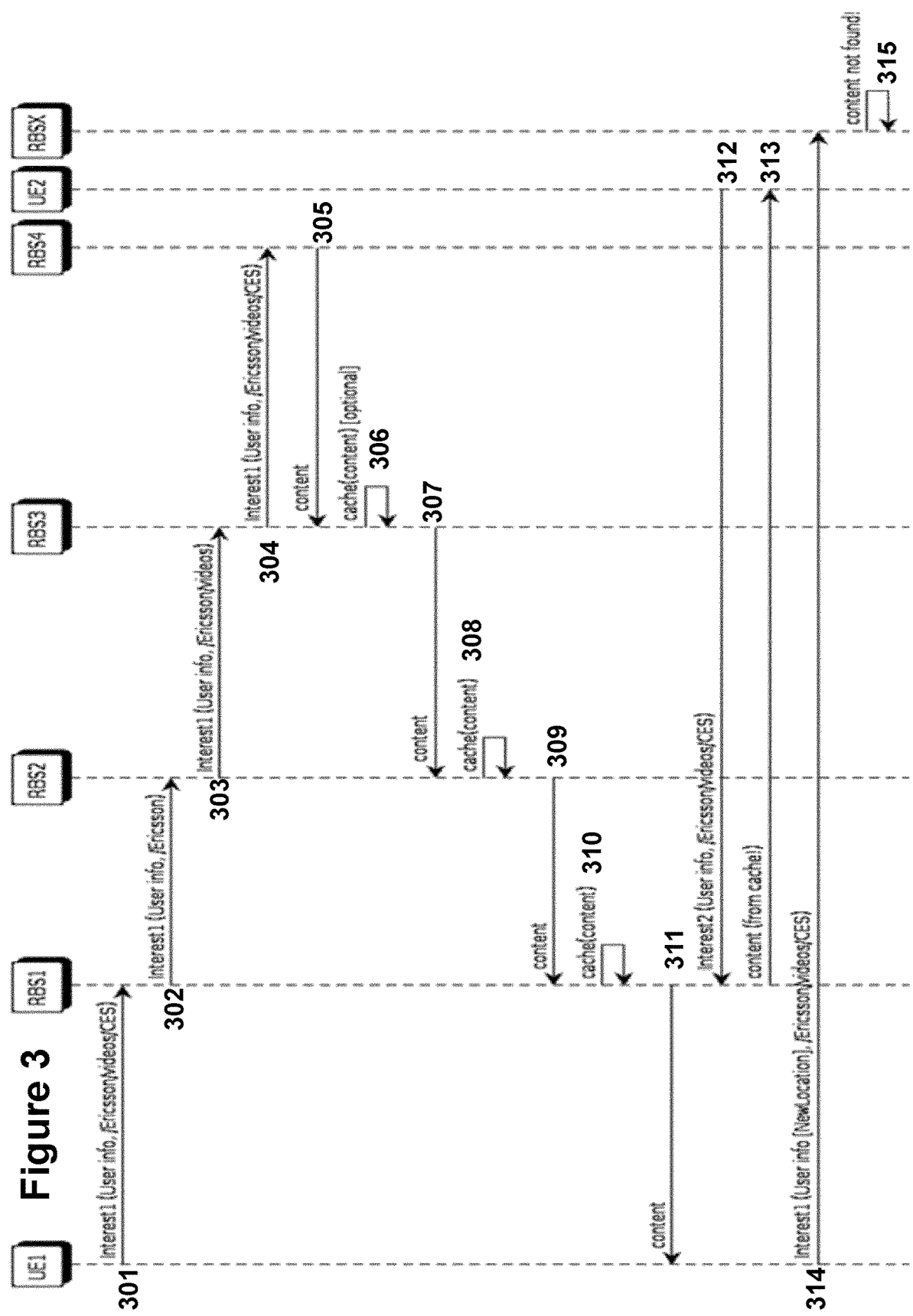
FIG. 3 is a schematic diagram illustrating a problem of existing methods.

FIG. 3 illustrates the problem of the existing methods with a particular example. In this example a user, UE1, is requesting content at 301 from an ICN network, which is implemented on RBSs in this case, RBS1-RBS4. The content is requested with the Interest message Interest1, providing information about the user and the content requested. The content is resolved hierarchically, so the requests are propagated at 302-304, between the RBSs, RBS1-RBS4 this case, in order to reach the final destination which is RBS4. RBS4 happens to have this content already, or is in close proximity to an external provider such as an online movie provider, which is the original owner of the requested content. As the content back propagates between the different RBSs to UE1 at 305, 307, 309 and 311, it may be optionally cached at 306, 308 and 310, either in all nodes or in a few selected nodes. When a different user, UE2, asks for the same content at 312, and UE2 is in close proximity, and therefore communicates, with RBS1, then it will receive the content immediately at 313. However, this approach, which is the default behavior in a current ICN network, becomes problematic for UE1 in case the location of UE1 changes. This is denoted in FIG. 3 as [NewLocation]. When UE1, at 314, makes a request to a new closer node in the new location, node RBSX, which is now the serving node of UE1 at the new location, the request being for the same content it has asked for previously, or perhaps for a different part of the same content in e.g., streaming media, RBSX cannot find the content there at 315. Normally in this case, the request will be propagated again from RBSX all the way to RBS4, or to another RBS in close proximity to RBSX, in order to obtain a cached copy of the requested content, which delays the process and uses resources in the network.

In order to address this problem, several embodiments are comprised herein. Embodiments herein may be understood to address the problem of mobility in ICN, in conjunction with predictive caching. Embodiments herein may be understood to relate to ensuring that a content is located at a node where a request for content is predicted to be received in the future, before the actual request for content is received, at e.g., the [NewLocation] following the example of FIG. 3. The prediction of the content that will be requested and where the request will be received may be made based on information obtained about the device that will be making the request. That is, embodiments herein may be understood to relate to a method and apparatus for predictive caching of content in a cellular network based on information relating to the devices making the request, such as e.g., device types.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Figure 4:
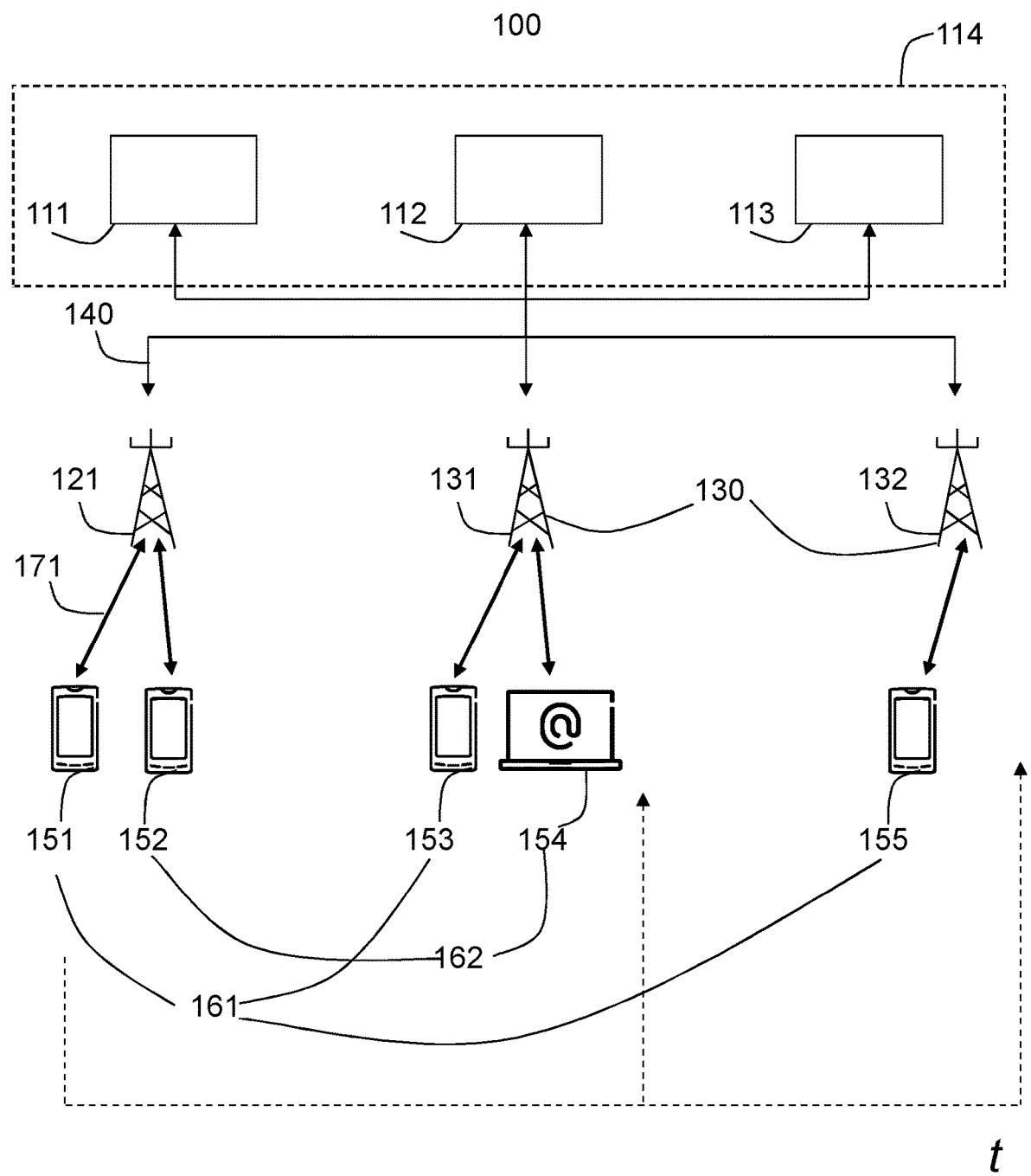
FIG. 4 is a schematic diagram illustrating embodiments of a wireless communications network, according to embodiments herein.

FIG. 4 depicts an example of a wireless communications network 100, sometimes also referred to as a cellular radio system, cellular network or wireless communications system, in which embodiments herein may be implemented. The wireless communications network 100 is a network supporting ICN at least some of the network nodes comprised in the wireless communications network 100. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, WCDMA, Universal Terrestrial Radio Access (UTRA) TDD, GSM network, GERAN network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

The wireless communications network 100 comprises a plurality of network nodes, whereof a first network node 111, a second network node 112, and a third network node 113 are depicted in FIG. 3. In some embodiments, any of the first network node 111, the second network node 112 and the third network node 113 may be the same network node, or be co-located. In some embodiments, all three of the first network node 111, the second network node 112 and the third network node 113 may be a same network node 114, also referred to herein as a Control network node 114. The Control network node 114 may be a network node performing a control function, or group-control function. In some particular examples, the Control network node 114 may be a so called "Group-Control Function node", which may combine the 3GPP and ICN domain. In other embodiments, such as that depicted in the non-limiting embodiment of FIG. 3, may be different nodes.

Any of network nodes comprised in the wireless communications network 100, such as the Control network node 114, the first network node 111, the second network node 112 and the third network node 113 may be a radio network node, that is a transmission point such as a radio base station, for example an eNB, an eNodeB, or an Home Node B, an Home eNode B or any other network node capable to serve a wireless device, such as a user equipment or a machine type communication device in the wireless communications network 100. In other examples, any of the Control network node 114, the first network node 111, the second network node 112 and the third network node 113, may be a core network node or a distributed node somewhere in the cloud.

The wireless communications network 100 covers a geographical area which, which in some embodiments may be divided into cell areas, wherein each cell area is served by a radio network node, although, one radio network node may serve one or several cells. The cells are not depicted in FIG. 4 to simplify the figure. Any of the radio network nodes comprised in the wireless communications network 100 may be of different classes, such as, e.g., macro eNodeB, home eNodeB or pico base station, based on transmission power and thereby also cell size. In other examples than those depicted in FIG. 5, wherein the wireless communications network 100 is a non-cellular system, any of the radio network nodes comprised in the wireless communications network 100 may serve receiving nodes with serving beams. Any of the radio network nodes comprised in the wireless communications network 100 may support one or several communication technologies, and its name may depend on the technology and terminology used. In 3GPP LTE, the any of the radio network nodes comprised in the wireless communications network 100, which may be referred to as eNodeBs or even eNBs, may be directly connected to one or more core networks.

The wireless communications network 100 also comprises a fourth network node 121, and one or more network nodes 130. The one or more network nodes 130 comprise a fifth network node 131 and a sixth network node 132. Any of the fourth network node 121 and the one or more network nodes 130 are radio network nodes, as just described. The fourth network node 121, and the one or more network nodes 130 are connected to the any of the Control network node 114, the first network node 111, the second network node 112 and the third network node 113 via one or more links 140.

A plurality of wireless devices are located in the wireless communication network 100, whereof a first wireless device 151, also referred to herein simply as wireless device 151 a second wireless device 152, a third wireless device 143, a fourth wireless device 154 and a fifth wireless device 155 are depicted in the non-limiting example of FIG. 4. Any of the wireless devices comprised in the wireless communications network 100 may be a wireless communication device such as a UE which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a wired or radio link in a communications system. Any of the wireless devices comprised in the wireless communications network 100 is enabled to communicate wirelessly in the wireless communications network 100. The communication may be performed e.g., via a RAN and possibly one or more core networks, comprised within the wireless communications network 100. The wireless device 151 may move with time (t), and change the serving network node from the fourth network node 121 to the fifth network node 131 or the sixth network node 132, as indicated by the dashed arrows. The dashed arrows therefore indicate a particular non-limiting example of a mobility pattern of the wireless device 151. The plurality of wireless devices are located in the wireless communication network 100 may be divided into one or more groups of wireless devices 161, 162, according to some criteria as explained below, comprising a first group 161 and a second group 162.

The fourth network node 121 is a serving radio network node of the wireless device 151. The wireless device 151 is configured to communicate within the wireless communications network 100 with the fourth network node 121 over a first link 171. Each of the second wireless device 152, the third wireless device 153, the fourth wireless device 154 and the fifth wireless device 155 is configured to communicate within the wireless communications network 100 with a respective serving radio network node with a respective link, as indicated with arrows in FIG. 3. The second wireless device 152 is also served by the fourth network node 121, the third wireless device 153 and the fourth wireless device 154 are served by the fifth network node 131, and the fifth wireless device 155 is served by the sixth network node 132.

In general, the usage of "first", "second", and/or "third", "fourth" and "fifth" herein may be understood to be an arbitrary way to denote different entities, and may be understood to not confer a cumulative or chronological character to the nouns they modify.

Figure 5:
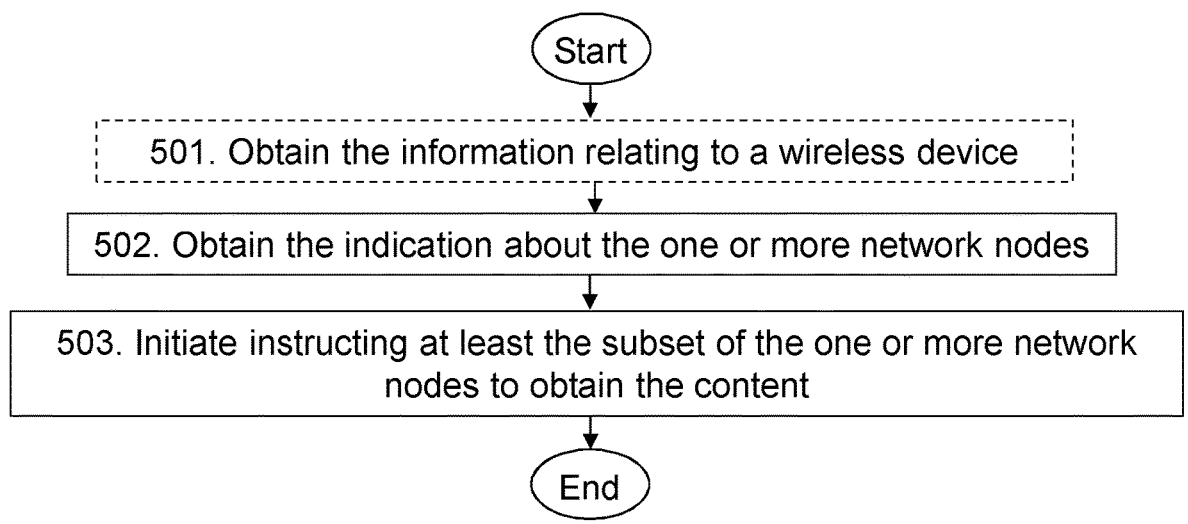
FIG. 5 is a flowchart depicting embodiments of a method in a first network node, according to embodiments herein.

Embodiments of a method performed by the first network node 111 for handling content in an Information-Centric Network, ICN, will now be described with reference to the flowchart depicted depicted in FIG. 5. The first network node 111 operates in the wireless communications system 100.

The first network node 111 may be a radio base station serving the wireless device 151, such as the fourth network node 121. In some particular examples, the first network node 111 may be a Mobility Tracker (MT) node.

Figure 6:
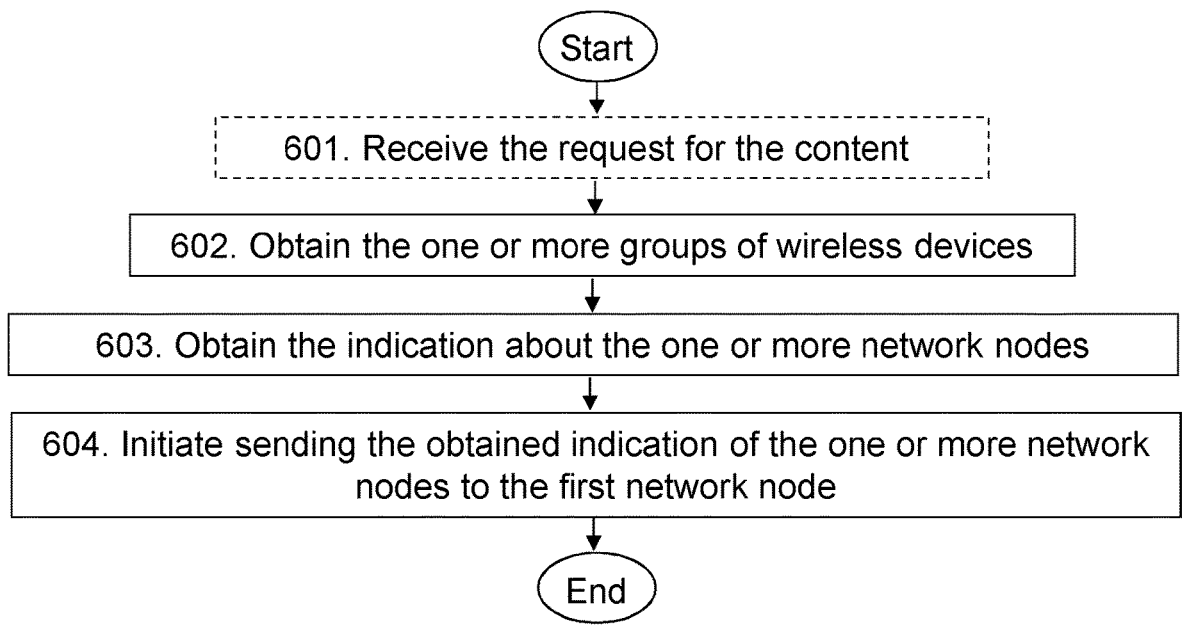
FIG. 6 is a flowchart depicting embodiments of a method in a second network node, according to embodiments herein.

The method may comprise one or more of the following actions. In some embodiments all the actions may be performed. In some embodiments, one or more actions may be performed. One or more embodiments may be combined, where applicable. All possible combinations are not described to simplify the description. In FIG. 6, optional actions are indicated with dashed lines.

Action 501

The wireless device 151 may be served, as depicted in FIG. 4, by the fourth network node 121. At some point in the future, the wireless device 151 may move and send a request for a content, e.g., a movie, to another network node in the wireless communications network 100, e.g., to the fifth network node 131. In order to shorten the time the wireless device 151 may have to wait before obtaining the content at the fifth network node 131, the first network node 111 may need to ensure that the requested content is located at the fifth network node 131, before the wireless device 151 even sends the request for content to the fifth network node 131. This may be achieved, according to embodiments herein, by predicting which network node or network nodes the wireless device 131 may send a request to. In order to do this, the first network node 111 may need to first obtain some information regarding the wireless device 151. This information may then help the first network node 111, or e.g., the second network node 112, to make a prediction on where the wireless device 151 may end up sending the request for the content. According to this, the first network node 111 may, in this Action, obtain one or more of the following: a type of the wireless device 151, information about a user of the wireless device 151, a history of requests for content from the wireless device 151, a requested content by the wireless device 151, e.g., a history of requested content, a location of the wireless device 151, and a mobility pattern of the wireless device 151. That is, the first network node 111 may collect information relating to the wireless device 151 that may enable to predict one or more network nodes the wireless device 151 may send a request for content to in the future.

In some examples, the request for content may be an Interest message in CCN. The content may be a Content Object in CCN.

The type of the wireless device 151 may be related the operative system of the wireless device 151, e.g., Android, IoS, to whether the wireless device 151 is a cell phone, a tablet, etc., or to its capabilities, e.g., the type of content it may be able to support. The information about the user of the wireless device 151, may be any biographical variable, such as age, that may help to predict the behavior of the user in terms of where the user may request the content, e.g., the mobility pattern of the user. As for the requested content, the user of the wireless device 151 may request a particular type of content at certain times of the day or the week, month, etc . . . and at certain locations. The location of the wireless device 151 may be geographical, or a radio location, e.g., an RBS it is connected with. The location of the wireless device 151 may also help to predict the route it may follow in its mobility, or the type of content it may request. For example, the wireless device 151 may only send requests for a movie when located at home. The mobility pattern may relate to specific location or to a route to follow in space and time. Obtaining may be understood as comprising receiving the obtained information from another network node in the wireless communications network 100, e.g., via the one or more links 140, or from the wireless device 151 itself, e.g., in examples where the first network node 111 may be the same network node as the fourth network node 121. In some instances, obtaining may also comprise the first network node 111 determining, calculating itself. For example, the first network node 111 may determine the mobility pattern of the wireless device 151 itself based on gathered mobility data regarding the wireless device 151.

Action 502

In this Action, the first network node 111 obtains an indication about one or more network nodes 130 where a request for a content by the wireless device 151 operating in the wireless communications network 100 is predicted to be received in one or more future time periods. The one or more network nodes 130 operate in the wireless communications network 100 supporting ICN. Obtaining here may be understood as determining or calculating itself, or receiving the indication from another network node in the wireless communications network 100, typically the second network node 112, e.g., via the one or more links 140.

The indication may be for example, a list of the one or more network nodes 130, e.g., a list of identifiers of the one or more network nodes 130. For example, RBS1 and RBS2. The one or more future time periods may be understood to comprise, in some examples, one or more future time points. The indication may also be an entry in a table, as described below in reference to Table 1 and Table 2. For each wireless device, for example, the indication may be a list of RBSs. For example, UE1 at RBS1, UE2 at RBS2, UE3 at RBS2 request content1. For each wireless device, the indication may even be a list of pairs, where each pair is an RBS and a time span.

In some embodiments, the one or more network nodes 130 may be radio base stations, e.g., RBSs, in this case ICN enabled RBSs.

The prediction of the one or more network nodes 130 where the request for the content by the wireless device 151 is to be received in the one or more future time periods may be performed by the first network node 111 itself, or by another network node in the wireless communications network 100, typically by the second network node 112, which may be e.g., a Predictive Location Node. The prediction may be performed via interpolation as explained in Action 603. Interpolation may be understood as identifying intermediate network nodes, or RBSs, in the way of a user from a start to a finish location.

The interpolation may be on new potential locations where the content may be requested, by obtaining a "class" of devices that are similar to the one that has made the original request, the wireless device 151 in this case, or other requests related to consuming similar content. The class of devices may be obtained from the second network node 112, which may generate it as described below in Action 602.

Accordingly, in some embodiments, the obtaining the indication about the one or more network nodes 130 in this Action 502 may be based on one or more groups of wireless devices 161, 162, e.g., the "class" of devices, operating in the wireless communications network 100. As described earlier in relation to FIG. 4, the wireless communications network 100 may comprise one or more groups of wireless devices 161, 162. The one or more groups of wireless devices 161, 162 comprise the wireless device 151. The one or more groups of wireless devices 161, 162 may be based on first information about the wireless devices in the one or more groups. The first information may be at least one of: a type of the wireless devices, information about users of the wireless devices, a history of requests for content from the wireless devices, the requested contents, location of the wireless devices, and mobility patterns of the wireless devices, similarly to how each of these variables were described in relation to the wireless device 151. Hence which network nodes may be comprised in the one or more network nodes 130 may be determined on the behavior or characteristics of the one or more groups of wireless devices 161.

Action 503

Once the first network node 111 may know which are the one or more network nodes 130 where the request for the content by the wireless device 151 is predicted to be received in the one or more future time periods, in this Action, the first network node 111 initiates instructing at least a subset of the one or more network nodes 130 to obtain the content, prior to the one or more future time periods, that is, prior to the subset of the one or more network nodes 130 receiving the request for the content in the one or more future time periods. That the first network node 111 initiates instructing may be understood as the first network node 111 sending one or more messages to the subset of the one or more network nodes 130, instructing them to fetch a copy of the content, or the first network node 111 triggering another network node in the wireless communications network 100 to do that. Any of the one or more messages may be for example a Notification message including all the relevant information, such as an identifier of the wireless device 151, and e.g., additional wireless devices, the one or more future time periods, etc . . . . Each of the nodes in the subset may then send an Interest message to request the content from a source.

In some embodiments, at least one of the obtaining the indication of Action 502 and the initiating instructing of this Action 503 may be based on the at least one of: the type of the wireless device 151, the information about a user of the wireless device 151, the history of requests for content from the wireless device 151, the requested content, the location of the wireless device 151, and the mobility pattern of the wireless device 151, as obtained in Action 501. This may be understood as that which network nodes are the one or more network nodes 130 may be influenced or determined by any of these variables.

Action 503 may be understood as the first network node 111 predictively caching the requested content at the one or more network nodes 130 that are predicted to serve the wireless device 151 in the one or more future time periods, based on the mobility of the wireless device 151. That is, in examples where the wireless device 151 may be moving, its requested content may be pre-cached to the e.g., RBS to which it may be predicted to be linked in future.

According to the foregoing, in some examples, the first network node 111 may be a mobility tracker node which may be responsible for proactively pushing content to future nodes that a UE may reach depending on its movement.

Embodiments of a method performed by a second network node 112 for facilitating handling content in an ICN will now be described with reference to the flowchart depicted depicted in FIG. 6. As stated earlier, the second network node 112 operates in the wireless communications network 100.

In some examples, the second network node 112 may be a Predictive Location Node (PLN).

The detailed description of some of the following corresponds to the same references provided above, in relation to the actions described for the first network node 111, and will thus not be repeated here. For example the request for a content may be an Interest message in CCN. The content may be a Content Object in CCN.

The method may comprise one or more of the following actions. In some embodiments all the actions may be performed. In some embodiments, one or more actions may be performed. One or more embodiments may be combined, where applicable. All possible combinations are not described to simplify the description. In FIG. 6 optional actions are indicated with dashed lines.

Action 601

As mentioned earlier, the second network node 112 may generate the one or more groups of wireless devices 161, 162, e.g., the "class" of devices, on which the determination of the one or more network nodes 130 where the request for the content by the wireless device may be predicted to be received. One example may be to group all devices connected to the same RBS as the wireless device 151, and requesting the same content. In order for the second network node 112 to be able to generate the one or more groups of wireless devices 161, 162, in this Action 601, the second network node 112 may first receive, from the third network node 113 operating in the wireless communications network 100, a request for a content from the wireless device 151. The request may comprise second information, the second information being based on the location of the wireless device 151, e.g., a current location. The location may be, e.g., a geographical location or a radio location.

Action 602

In this Action, the second network node 112 obtains the one or more groups of wireless devices 161, 162 operating in the wireless communications network 100, based on first information about the wireless devices, the first information being as described earlier. That is, the second network node 112 may determine, generate, or alternatively, receive a determination from another network node of, the one or more groups of wireless devices 161, 162 based on the first information. In other words, the second network node 112 may generate one or more "classes" of devices that are similar to the one that has made the original request, the wireless device 151 in this case, or other requests related to consuming similar content. To perform the obtaining in this Action, content and device similarity may be addressed via machine learning techniques such as k-means, as for example described in http://home.deib.polimi.it/matteucc/Clusterinq/tutorial_html/kmeans.html.

The one or more groups of wireless devices 161, 162 may be indicated by value representing one of the device classes, and/or Mobile Station International Subscriber Directory Number (MSISDN) relations. A unique identifier for each wireless device may be used to identify each wireless device. It may be an MSISDN or another identifier.

The first information, as described earlier, may be at least one of: the type of the wireless devices, the information about users of the wireless devices, the history of requests for content from the wireless devices, the requested contents, the location of the wireless devices, and the mobility patterns of the wireless devices.

In some embodiments, the obtaining of the one or more groups in this Action may be further based on the second information obtained in Action 601.

Action 603

In this Action 603, the second network node 112, obtains the indication about the one or more network nodes 130 where the request for the content by the wireless device 151 comprised in the one or more groups of wireless devices 161, 162 is predicted to be received in the one or more future time periods. Obtaining the indication may be understood as determining or generating itself, or receiving the indication from another network node in the wireless communications network 100, or from the wireless device 151. Typically, the second network node 112 may determine the indication itself. The obtaining 603 the indication about the one or more network nodes 130 is based on the obtained one or more groups of wireless devices 161, 162. The one or more network nodes 130 operate in the wireless communications network 100 supporting ICN.

In other words, in Action 603, the second network node 112 may predict or infer, e.g., via interpolation, on new potential locations where this content may be requested, by the one or more "classes" of devices generated in Action 602.

In the examples wherein the second network node 112 may obtain the indication from the wireless device 151 itself, the fact that the request for the content by the wireless device 151 is predicted to be received by the one or more network nodes 130 in the one or more future time periods may be understood to comprise the certain determination of the mobility plans by the wireless device 151, as described later in relation to Action 801.

As described before, the indication may be a list of the one or more network nodes 130.

Action 604

In this Action 604, the second network node 112, initiates sending the obtained indication about the one or more network nodes 130 to the first network node 111 operating in the wireless communications network 100. Similarly to what was described earlier, initiate sending may the second network node 112 sending itself, e.g., via the one or more links 140, or triggering another network node to send.

According to the foregoing, in some examples, the second network node 112 may be a node called predictive location node, whose main task may be to predict the future location of a device based on input from the device itself or using historical information.

Figure 7:
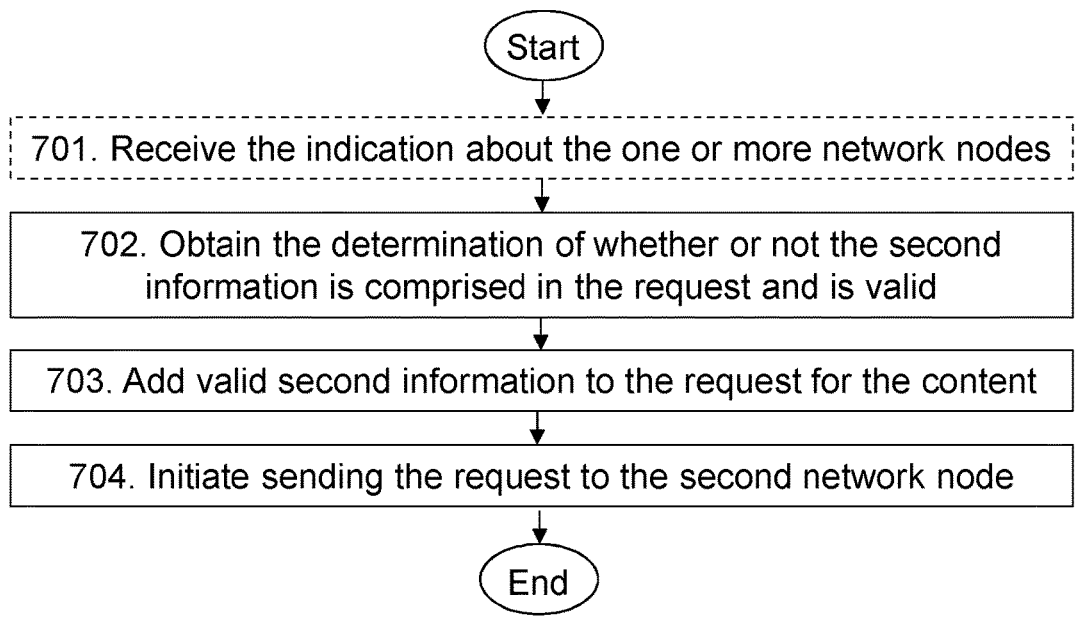
FIG. 7 is a flowchart depicting embodiments of a method in a third network node, according to embodiments herein.

Embodiments of a method performed by a third network node 113 for facilitating handling content in ICN will now be described with reference to the flowchart depicted depicted in FIG. 7. As stated earlier, the third network node 113 operates in the wireless communications network 100.

In some examples, the third network node 113 may be a Mobility Agent (MA).

The detailed description of some of the following corresponds to the same references provided above, in relation to the actions described for the first network node 111, and will thus not be repeated here. For example the request for a content may be an Interest message in CCN. The content may be a Content Object in CCN.

The method may comprise one or more of the following actions. In some embodiments all the actions may be performed. In some embodiments, one or more actions may be performed. One or more embodiments may be combined, where applicable. All possible combinations are not described to simplify the description. Note that in some embodiments, the order of the Actions may be changed. In FIG. 7 optional actions are indicated with dashed lines.

Action 701

In some cases, the wireless device 151 itself may have a plan of which network nodes it is going to send the request for the content in the future. This information may also be used by the first network node 111 to perform the predictive caching of embodiments herein. In such cases, the wireless device 151 may send the indication to the third network node 113 instead of the first network node 111 because the user of the wireless device 151 may know its mobility pattern and may send its interest request along with its future location to the corresponding node.

Accordingly, in this Action 701, the third network node 113 may receive, from the wireless device 151, the indication about the one or more network nodes 130 where the request for the content by the wireless device 151 is predicted to be received in the one or more future time periods. That is, the one or more network nodes 130 where the wireless device 151 is planning on sending the request for the content to. As before, the one or more network nodes 130 may operate in the wireless communications network 100 supporting ICN. The receiving may be performed e.g., via the first link 171 and one or more links 140.

Action 702

In this Action, the third network node 113 obtains a determination of whether or not the second information is comprised in the request for the content received from the wireless device 151 operating in the wireless communications network 100. As described earlier, the second information is based on the location of the wireless device 151. For example, the second information may not be comprised in the request if the wireless device 151 does not have any capability of identifying its location. The second information is valid. This may be understood as that, as part of Action 702, the third network node 113 may also determine whether the second information, if comprised in the request, is valid.

The request for the content may have been received from the wireless device 151 via, e.g., the fourth network node 121, serving the wireless device 151, through the first link 171 and one or more links 140.

The second information may be considered to be valid if it originates from a trusted source. Some examples used may be public/private key etc . . . .

Action 703

In this Action 703, third network node 113, adds valid second information to the request for the content received from the wireless device 151 wherein the second information is determined to not be comprised in the request, or wherein the second information comprised in the request is determined to not be valid.

For example, if the second information is not comprised in the request, the location information of the closest RBS may be used instead by the third network node 113.

The wireless communications network 100 may comprise one or more mobile agents (MA) such as the third network node 113 for each wireless device within an ICN network, in accordance with https://tools.ietf.org/html/draft-irtf-icnrg-ccxsemantics-02. To perform this Action 703, as part of adding the second information, the name of the third network node 113, that is, the agent name, may be represented as an ICN interest as well, in order to be able to refer to the agent in an ICN-compliant manner. In order to ensure a unique name for the agent, the MSISDN of the wireless device 151 may be relied on.

In any of the embodiments herein, a naming convention for the content may be used. Since content is key in ICN, some parts of the content name may be assumed to follow a Uniform Resource Identifier (URI) structure, such as www.ericsson.com, and other parts within the naming scheme may be assumed to be there as well, but to denote more additional, enriched, information such as the operator, lastname, firstname, cellId, and timestamp. One example of such ICN interest name is www.ericsson.com/5g_network.avi/2016/05/04/14/40, which refers to a video that has been added to erisson.com on 2016-05-04-14:40. The look up mechanism in ICN may then be able to find this content using a partial match, even if the request is simply www.ericsson.com/5g_network.avi. In this case, the partial match may link directly to the latest, timestamp-wise, content that may be available in the network. This may be achieved in a similar fashion as the UNIX operating system may create symbolic links for files.

Action 704

In this Action 704, the third network node 113, initiates sending the request with the valid second information to the second network node 112 operating in the wireless communications network 100. Similarly to what was described earlier, initiate sending may the third network node 113 sending itself, e.g., via the one or more links 140, or triggering another network node to send.

According to the foregoing, in some examples, the third network node 113 may be a node called mobility agent which may be tasked with generating, and/or enriching, the name of a content based on the mobility of the first wireless device 151.

Figure 8:
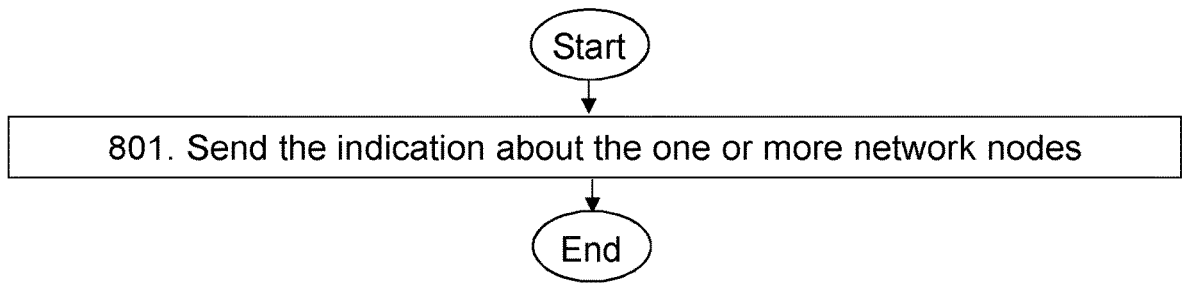
FIG. 8 is a schematic diagram illustrating an example of embodiments of a method in a wireless device, according to embodiments herein.

Embodiments of a method performed by the wireless device 151 for facilitating handling content in an ICN will now be described with reference to the flowchart depicted depicted in FIG. 8. As stated earlier, the wireless device 151 operates in the wireless communications network 100.

The detailed description of some of the following corresponds to the same references provided above, in relation to the actions described for the first network node 111, and will thus not be repeated here. For example the request for a content may be an Interest message in CCN. The content may be a Content Object in CCN.

Action 801

In this Action 801, the wireless device 151 sends the indication to a network node 111, 112, 113 operating in the wireless communications network 100, the indication being about the one or more network nodes 130 where the request for the content by the wireless device 151 is predicted to be received in one or more future time periods. That is, the one or more network nodes 130 where the wireless device 151 is to send the request for the content, or is planning to send the request for the content, and therefore, where the request for the content by the wireless device is predicted to be received. The one or more network nodes 130 operate in the wireless communications network 100 supporting ICN. The sending may be performed e.g., via the first link 171 and one or more links 140. The request for the content may or may not comprise the valid second information.

Figure 9:
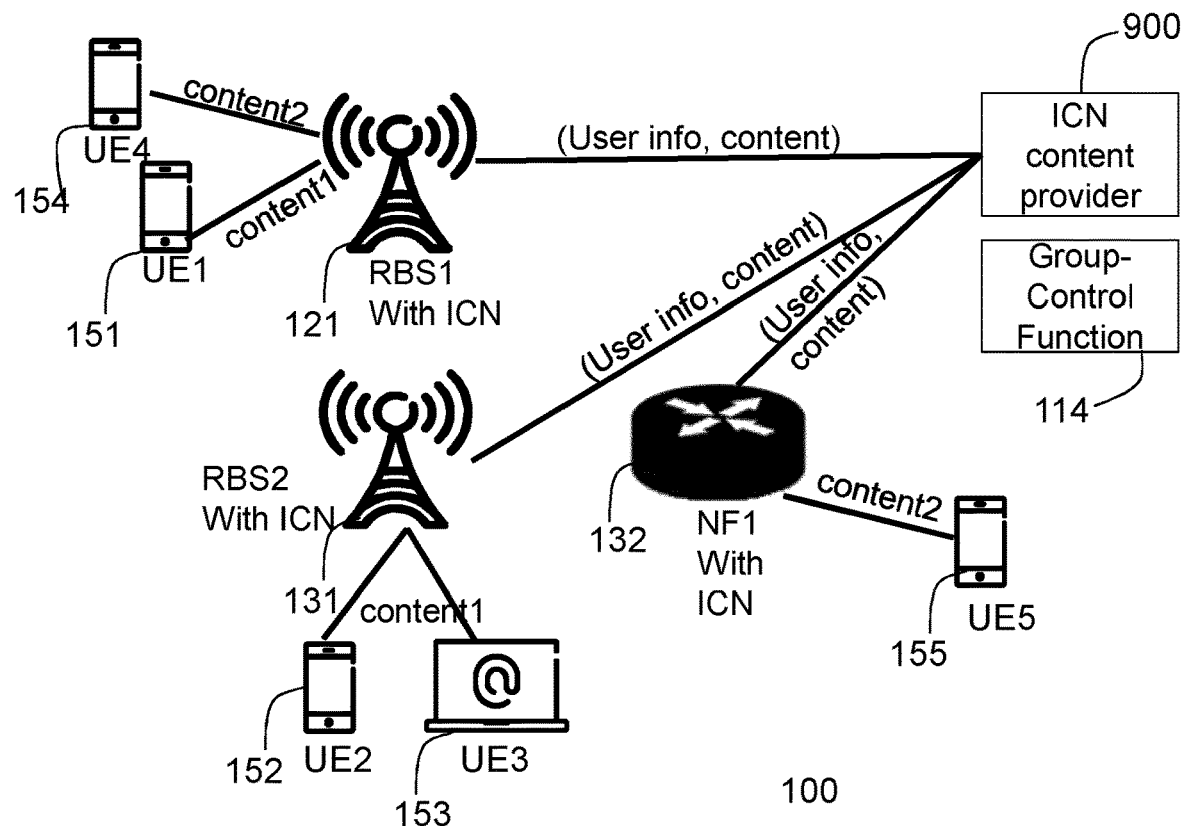
FIG. 9 is a schematic diagram illustrating embodiments of different components of the wireless communications network and their interactions, according to embodiments herein.

In some examples of embodiments herein, the wireless communications network 100 may comprise the following components: a) the one or more groups of wireless devices 161, 162 may be User devices, e.g., UE, requesting for a content; b) the one or more network nodes 130, as well as the fourth network node 121 may be base stations or RBS with ICN, that is, ICN enabled RBS; and c) the Control network node 114 may be a node performing a Group-Control function, the one or more groups of wireless devices 161, 162 may be may be defined together based on the contents requested by them. The Group-Control function may also store information about the RBS to which these devices may be primarily linked. This information may be stored in a database along with the content. The Group-Control function may reside in RBSs, a Network Function (NF), or somewhere in the Cloud. It does not need to be centralized. In a further particular example, the control function may be a part of the Management and Analytics function of an RBS. FIG. 9 is a schematic diagram illustrating a particular non-limiting example of the wireless communications network 100 according to this description, depicting its different components and their interactions. In FIG. 9, five wireless devices, are sending interest for certain content. The five wireless devices are: the first wireless device 151 which is represented as UE1, the second wireless device 152 which is represented as UE2, the third wireless device 153 which is represented as UE3, the fourth wireless device 154 which is represented as UE4 154, and the fifth wireless device 155 which is represented as UE5. The five wireless devices may be comprised in the one or more groups of wireless devices 161, 162. The grouping of the wireless devices may be based on the ICN contents they request. Also based on the device type, e.g., Android type of device, it may be possible to know what type of content they may request, and where and when it may be needed. The serving RBSs may be the fourth network node 121 represented as RBS1, the fifth network node 131 represented as RBS2, or the fifth network node 131 represented as NF1. Each radio network node in the wireless communications network 100 has an ICN functionality. The Control network node 114, that is the Group-Control function, stores some sort of indication of an array of grouped devices, the one or more groups of wireless devices 161, 162, and their corresponding serving RBSs, based on the contents they request, Content 1 or Content 2, from an ICN content provider 900. A non-limiting example is shown in the following tables.

TABLE 1

Group for content1

| UE1 | RBS1 |
|---|---|
| UE2 | RBS2 |
| UE3 | RBS2 |

TABLE 2

Group for content2

| UE4 | RBS1 |
|---|---|
| UE5 | NF1 |

Figure 10:
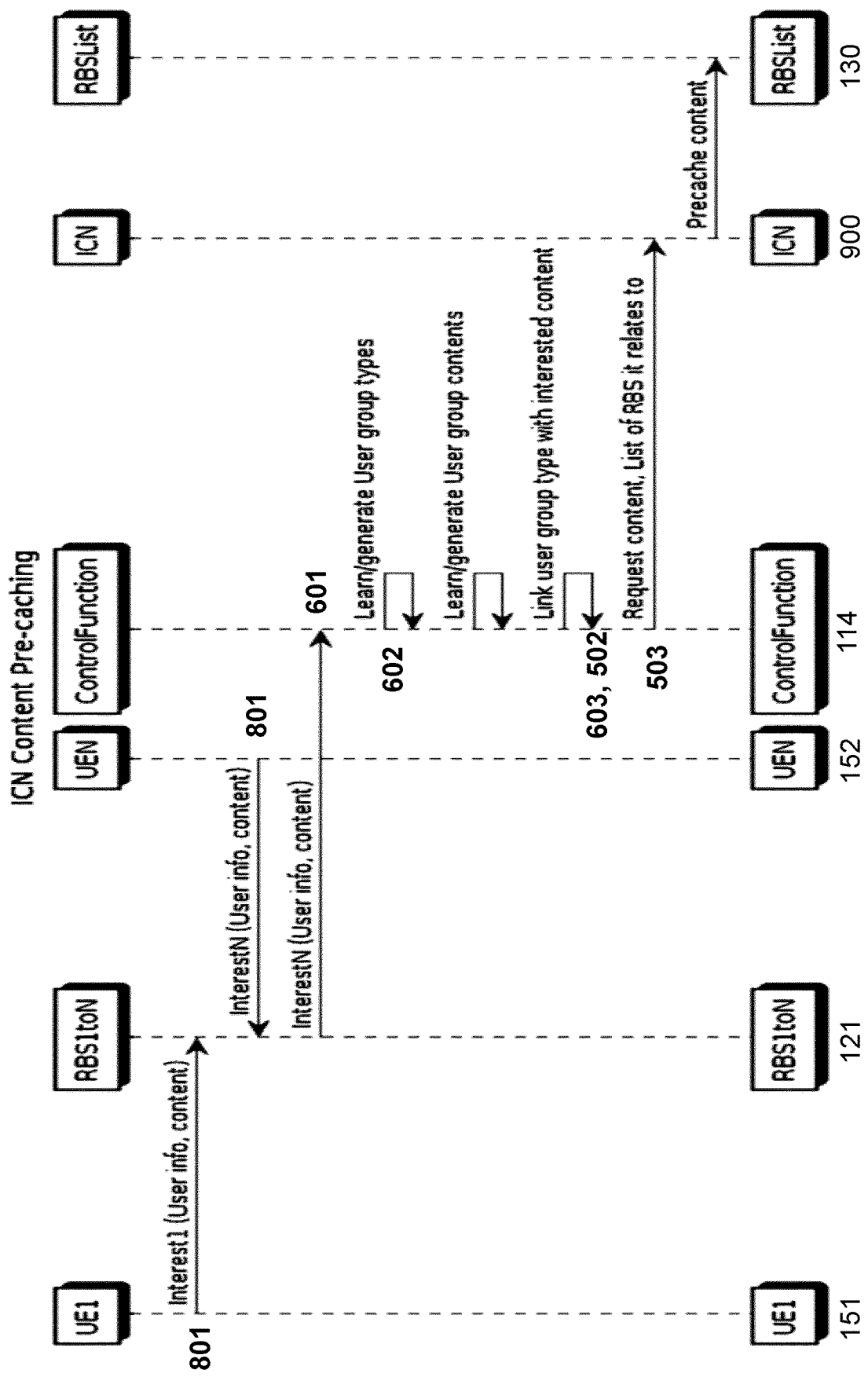
FIG. 10 is a schematic diagram illustrating a non-limiting example of predictive caching of content based on grouping of devices and history interests, according to embodiments herein.

FIG. 10 is a schematic representation describing a non-limiting example of embodiments herein to predictively cache the content at the RBS to which a UE may be connected with. In the particular non-limiting example of FIG. 10, all three of the first network node 111, the second network node 112 and the third network node 113 are the same network node 114 or Control network node 114, represented here as the Group-Control Function node. In FIG. 10, the first wireless device 151 is represented as UE1, and the third wireless device 153 is represented as UEN. According to Action 801, each UE generates a request and sends it to a respective serving radio network node, such as the fourth network node 121, which is represented in the Figure as RBS1toN. The request is an interest in terms of ICN, that comprises the name of the requested item along with information about the user. User information may comprise the type of the wireless device or device type, e.g., cell phone, iPad, etc, the location of the wireless device, e.g., an RBS it is connected with, etc . . . . Each RBS forwards all interests, represented as InterestN, from all UEs connected to it to the Control network node 114, which obtains them according to Action 601. This function then, according to Action 602, generates/learns the one or more groups of wireless devices 161, 162, that is, user groups based on device types and interested contents. This function also links the group types with the interested contents as part of the Action 603, 502 of obtaining the indication about the one or more network nodes 130 where the request for the content by a wireless device 151 comprised in the one or more groups of wireless devices 161, 162 is predicted to be received in the one or more future time periods. Then, according to Action 503, the Group-Control Function node initiates instructing at least the subset of the one or more network nodes 130 to obtain the content by forwarding a modified interest request to the ICN content provider node 900 for the contents, and the related RBSs at which the content is needed to be cached. The ICN content provider node 900 then caches the contents to their respective RBSs. For example, according to Table 1, content 1 will be cached to RBS1 and RBS2, while according to Table 2, content 2 will be cached to RBS1 and NF1. The Control network node 114 or the Group-Control Function that may combine the 3GPP and the ICN domain. Using embodiments herein, contents may be predictively cached for stationary and mobile devices in ICN.

Figure 11:
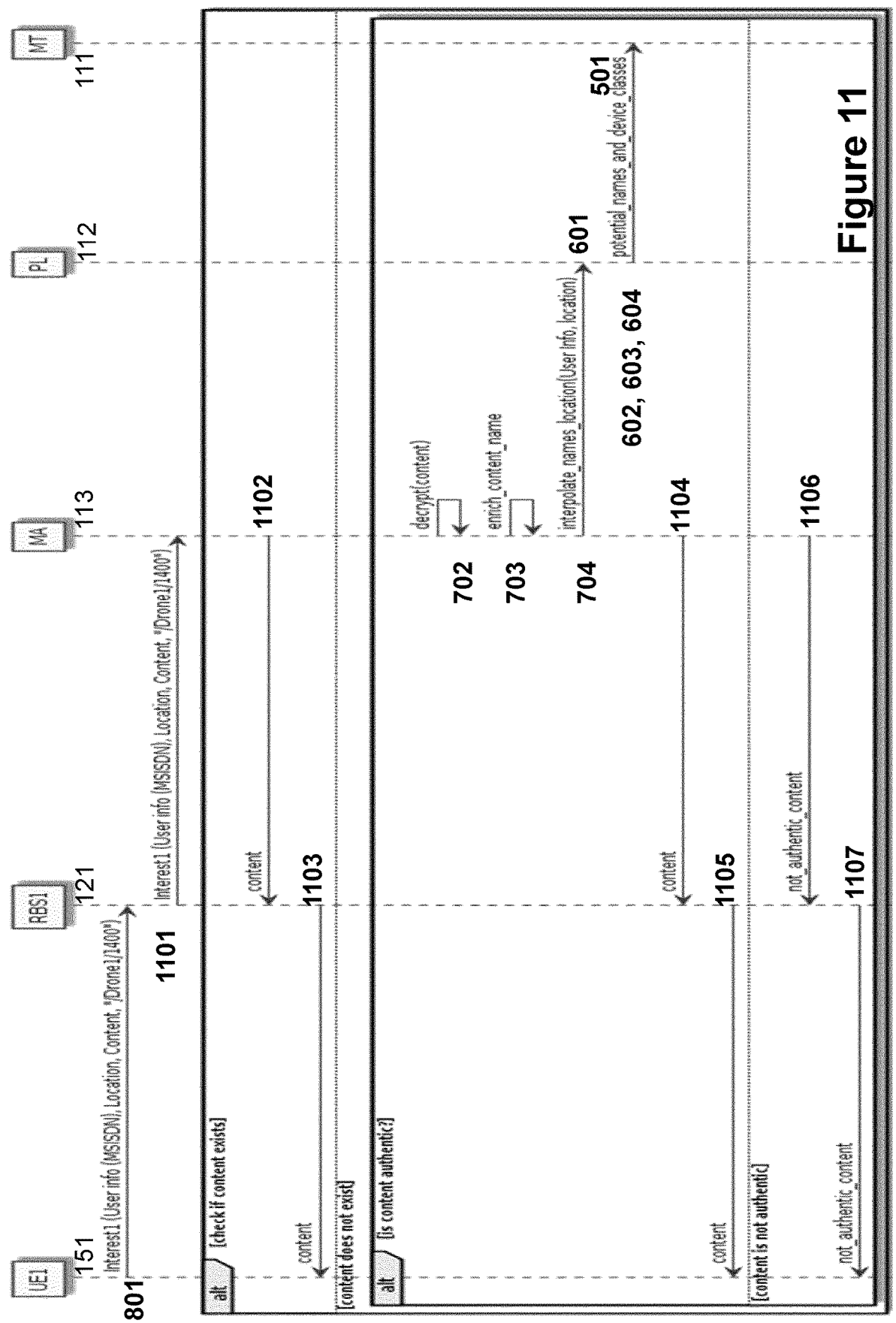
FIG. 11 is a schematic diagram illustrating a non-limiting example of predictive caching of content based on grouping of devices and history interests, according to embodiments herein.

In other examples, such as that depicted in FIG. 11, the first network node 111, the second network node 112 and the third network node 113 are different network nodes. The first network node 111, the second network node 112 and the third network node 113 may be considered refinements of the Group-Control Function, which address the challenge of proactively disseminating content to future nodes which a mobile device will visit at a future point in time. Embodiments herein are related to ensuring that the content the wireless device 151, represented in the Figure as UE1, has requested is already available at a new serving network node, RBSX, when it reaches a new location, e.g., [NewLocation]. This may be achieved by the UE1 being capable of informing the ICN network about its movement, in accordance to Action 801, and/or because the ICN network is capable of inferring the potential future positions of UE1, according to Action 703. As shown in the sequence diagram, at 801, UE1 submits an ICN interest to the ICN network by sending it to the fourth network node 121, represented here as RBS1. RBS1 may first check internally to see if the content is really new by, at 1101, asking the third network node 113, a Mobility Agent (MA). The case where the content is not new, the third network node, at 1102 forwards the content to the RBS1, and at 1103 the RBS1 forwards the content to UE1. If the content is new, as, in some non-limiting examples, part of Action 702, the MA will try to check for its authenticity. At this stage, it is assumed that UE1 and MA have exchanged keys, public/private, and may communicate securely. If it is authentic, the MA will decrypt, then at 703, enrich the name of the interest in order to include additional information that may not be available in the UE1. An example here would be a UE1 that does not have any capability of identifying its location. In this case, the location information of the closest RBS may be used instead. Moreover, in accordance with Action 601, the MA will register the request with the second network node 112, the Predictive Location node, so that this node, in accordance with Action 603, may infer, e.g., via interpolation, on new potential locations where this content may be requested, by, in accordance with Action 602, generating a "class" of devices that are similar to the one that has made the original request, or other requests related to consuming similar content. Device class and MSISDNS relations may be communicated, in accordance with Action 604, to the first network node 111, the Mobility Tracker node (MT), so that there may be re-used later on when disseminating content ahead of time. The Mobility Tracker (MT) is informed about these locations, in accordance with Action 501, and device class, and the UE1 receives an acknowledgement. In this non-limiting example, the MA is assumed to have the content. At 1104, the content is presumed to be authentic and the MA sends the content to the RBS1, which then forwards it to the UE1 at 1105. If the content is not authentic, at 1106 the MA notifies the RBS1 that the content is not authentic, which then forwards the notification to the UE1 at 1107.

Figure 12:
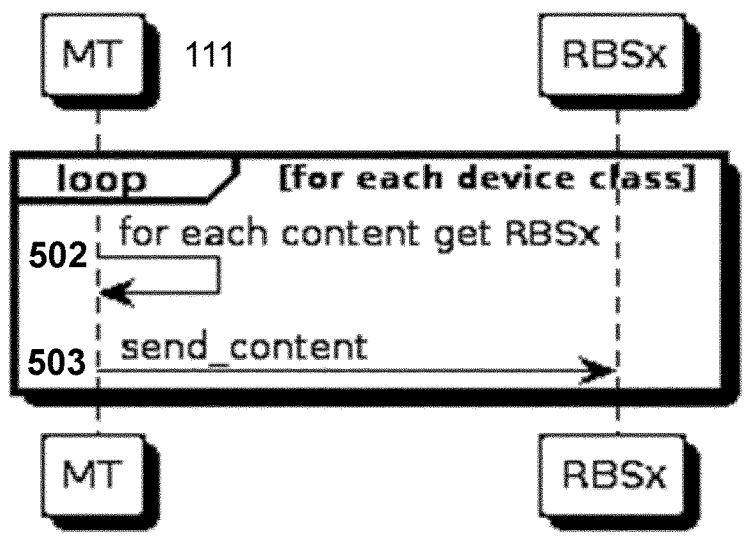
FIG. 12 is a schematic diagram illustrating a non-limiting example of predictive caching of content based on grouping of devices and history interests, according to embodiments herein.

FIG. 12 shows how, in some examples of embodiments herein, the first network node 11, the Mobility Tracker, on periodic basis, may, in accordance with Action 502, iterate through the different potential locations it has, and the associated content, and by looking into a database which associates location to corresponding RBSs, it may then disseminate content to these RBSs, in accordance with Action 503, in order to make it available ahead of time.

One advantage of embodiments herein is that the methods described enable possibility to provide low latency of real-time streaming in ICN, since the content will be pre-cached close to the device or type of devices, e.g., knowing the route that the devices may be taking, or the location of device types, etc . . . . This is considering that real-time streaming is typically associated with a latency for obtaining the content.

Additional benefits of the predictive caching according to embodiments herein is enabling load balancing of the network, since the downloading of the content to the cache may happen when the network has low load.

A further advantage of embodiments herein is that the methods described herein, may provide benefits for the publisher to know what content to advertise, based on information about a user.

To exemplify some of the foregoing in other words, particular examples herein may relate to a method for predictive caching of content, based on the device type, history of interest requests, and mobility pattern of devices, a specific location or a route.

Figure 13:
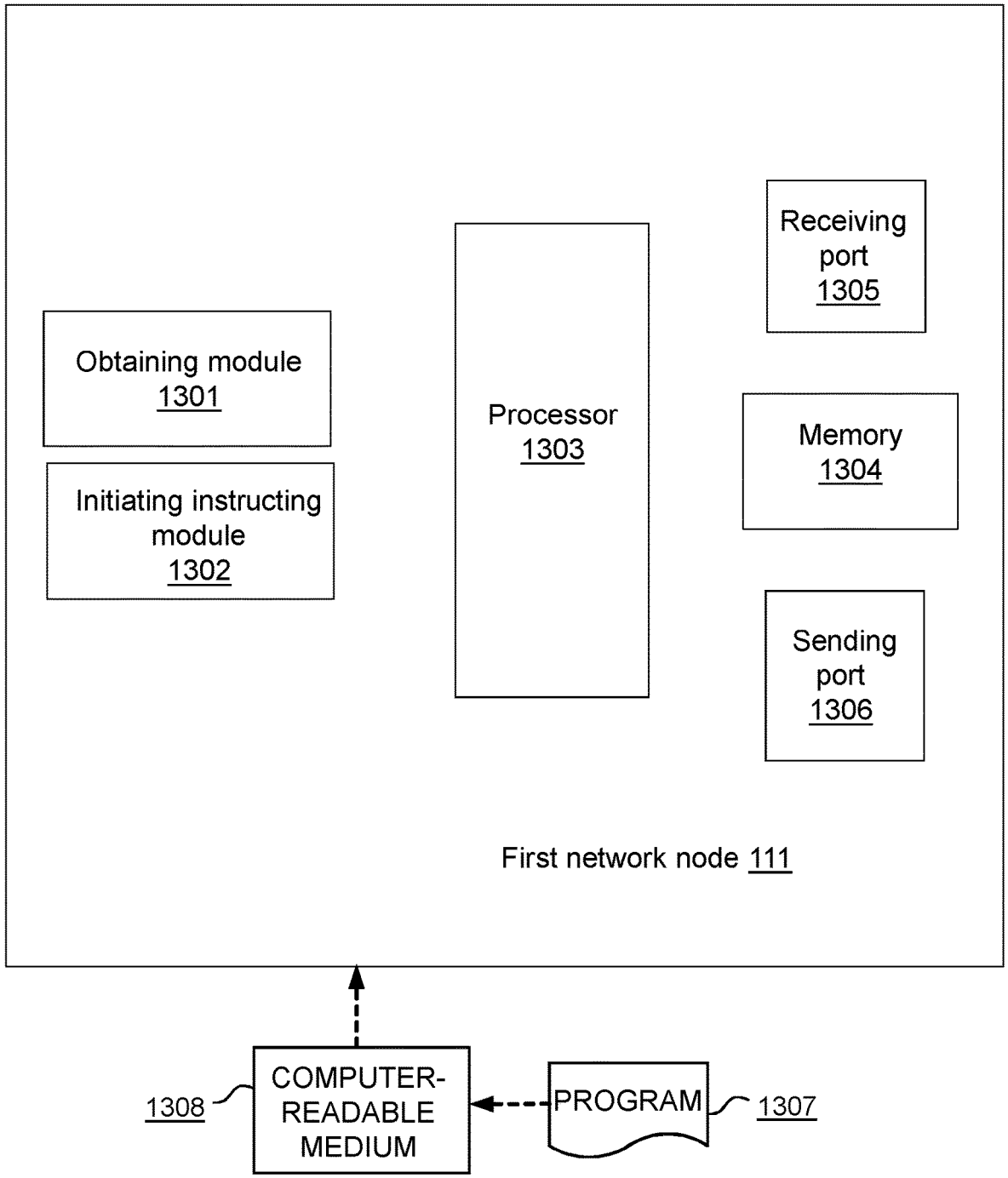
FIG. 13 is a schematic block diagram illustrating embodiments of a first network node, according to embodiments herein.

To perform the method actions described above in relation to FIGS. 5 and 10-12, the first network node 111 for handling content in an ICN may comprise the following arrangement depicted in FIG. 13. As stated earlier, the first network node 111 is configured to operate in a wireless communications network 100.

The detailed description of some of the following corresponds to the same references provided above, in relation to the actions described for the first network node 111, and will thus not be repeated here. For example, the first network node 111 may be the radio base station serving the wireless device 151.

The first network node 111 is further configured to, e.g., by means of an obtaining module 1301 configured to, obtain the indication about the one or more network nodes 130 where the request for the content by the wireless device 151 operating in the wireless communications network 100 is predicted to be received in the one or more future time periods, the one or more network nodes 130 being configured to operate in the wireless communications network 100 supporting ICN.

The one or more network nodes 130 may be radio base stations.

The first network node 111 is further configured to, e.g., by means of an initiating instructing module 1302 configured to, initiate instructing at least the subset of the one or more network nodes 130 to obtain the content prior to the one or more future time periods.

In some embodiments, at least one of to obtain and to initiate instructing is configured to be based on at least one of: the type of the wireless device 151, the information about the user of the wireless device 151, the history of requests for content from the wireless device 151, the content configured to be requested, the location of the wireless device 151, and the mobility pattern of the wireless device 151.

In some embodiments, the first network node 111 may be further configured to e.g., by means of the obtaining module 1301 configured to, obtain the one or more of: the type of the wireless device 151, the information about the user of the wireless device 151, the history of requests for content from the wireless device 151, the content configured to be requested, the location of the wireless device 151, and the mobility pattern of the wireless device 151.

In some embodiments, to obtain the indication about the one or more network nodes 130 may be configured to be based on one or more groups of wireless devices 161, 162 operating in the wireless communications network 100, the one or more groups of wireless devices 161, 162 comprising the wireless device 151, the one or more groups of wireless devices 161, 162 being configured to be based on the first information about the wireless devices.

The first information may be at least one of: the type of the wireless devices, information about users of the wireless devices, the history of requests for content from the wireless devices, the contents configured to be requested, the location of the wireless devices, and the mobility patterns of the wireless devices The embodiments herein may be implemented through one or more processors, such as a processor 1303 in the first network node 111 depicted in FIG. 13, together with computer program code for performing the functions and actions of the embodiments herein. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1304 comprising one or more memory units. The memory 1304 is arranged to be used to store obtained information, store data, configurations, and applications etc. to perform the methods herein when being executed in the first network node 111.

In some embodiments, the first network node 111 may receive information from the second network node 112, the third network node 113 and/or the wireless device 151, through a receiving port 1305. In some embodiments, the receiving port 1305 may be, for example, connected to one or more antennas in first network node 111. In other embodiments, the first network node 111 may receive information from another structure in the wireless communications network 100 through the receiving port 1305. Since the receiving port 1305 may be in communication with the processor 1303, the receiving port 1305 may then send the received information to the processor 1303. The receiving port 1305 may also be configured to receive other information.

The processor 1303 in the first network node 111 may be further configured to transmit or send information to e.g., the second network node 112, through a sending port 1306, which may be in communication with the processor 1303, and the memory 1304.

Those skilled in the art will also appreciate that the obtaining module 1301, and the initiating instructing module 1302 described above may refer to a combination of analog and digital modules, and/or one or more processors configured with software and/or firmware, e.g., stored in memory, that, when executed by the one or more processors such as the processor 1303, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1301-1302 described above may be implemented as one or more applications running on one or more processors such as the processor 1303.

Thus, the methods according to the embodiments described herein for the first network node 111 may be respectively implemented by means of a computer program 1307 product, comprising instructions, i.e., software code portions, which, when executed on at least one processor 1303, cause the at least one processor 1303 to carry out the action described herein, as performed by the first network node 111. The computer program 1307 product may be stored on a computer-readable storage medium 1308. The computer-readable storage medium 1308, having stored thereon the computer program 1307, may comprise instructions which, when executed on at least one processor 1303, cause the at least one processor 1303 to carry out the action described herein, as performed by the first network node 111. In some embodiments, the computer-readable storage medium 1308 may be a non-transitory computer-readable storage medium, such as a CD ROM disc, or a memory stick. In other embodiments, the computer program 1307 product may be stored on a carrier containing the computer program 1307 just described, wherein the carrier is one of an electronic signal, optical signal, radio signal, or the computer-readable storage medium 1308, as described above.

Figure 14:
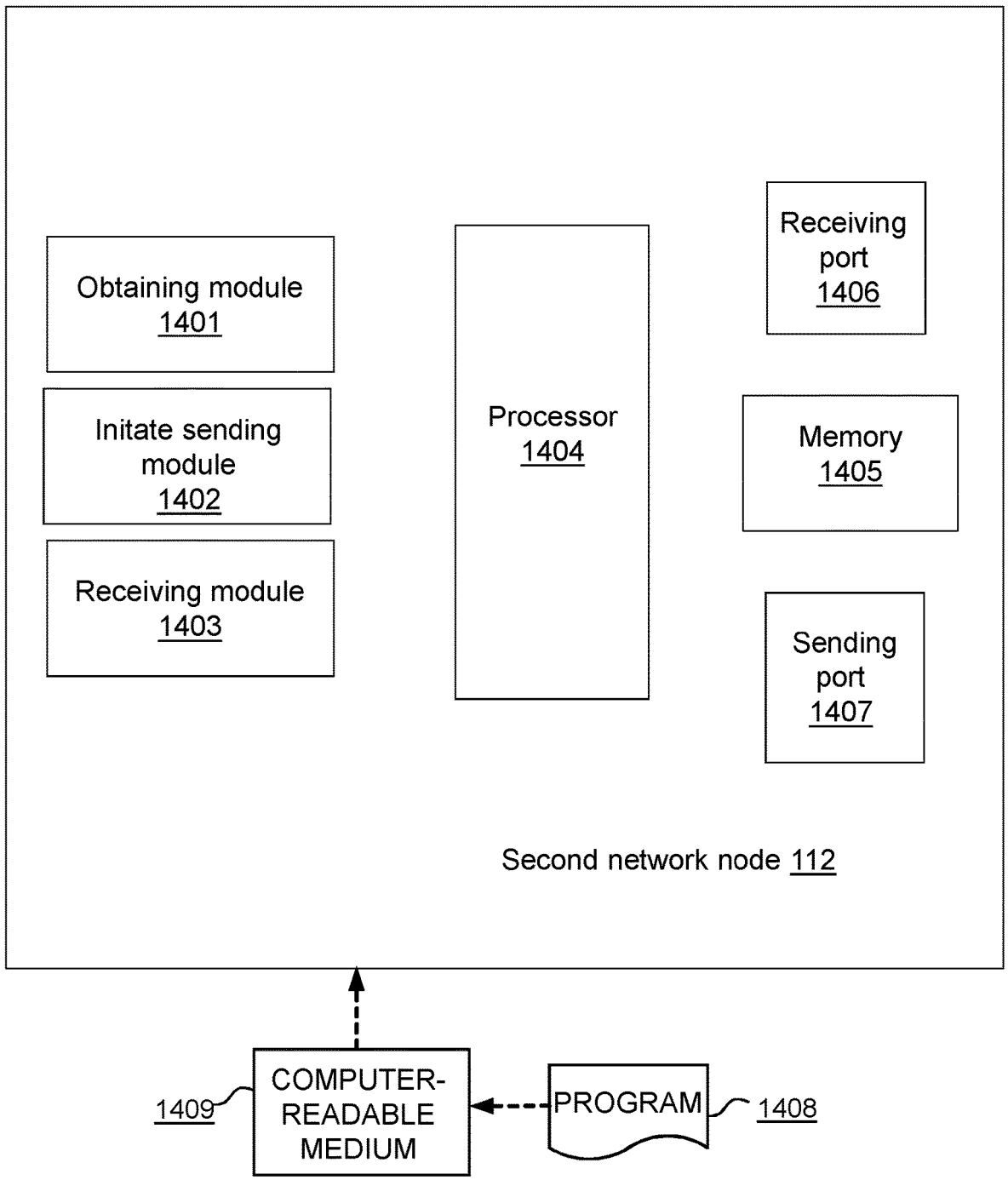
FIG. 14 is a schematic block diagram illustrating embodiments of a second network node, according to embodiments herein.

To perform the method actions described above in relation to FIGS. 6 and 10-12, the second network node 112 for facilitating handling content in an ICN may comprise the following arrangement depicted in FIG. 14. As stated earlier, the second network node 112 is configured to operate in the wireless communications network 100.

The detailed description of some of the following corresponds to the same references provided above, in relation to the actions described for the second network node 112, and will thus not be repeated here. For example, in some embodiments, the second network node 112 may be a PLN.

The second network node 112 is configured to, e.g., by means of an obtaining module 1401 configured to, obtain the one or more groups of wireless devices 161, 162 configured to operate in the wireless communications network 100, based on the first information about the wireless devices.

The second network node 112 is further configured to, e.g., by means of the obtaining module 1401 further configured to, obtain the indication about the one or more network nodes 130 where the request for the content by the wireless device 151 comprised in the one or more groups of wireless devices 161, 162 is predicted to be received in the one or more future time periods, wherein to obtain the indication about the one or more network nodes 130 is configured to be based on the obtained one or more groups, and the one or more network nodes 130 are configured to operate in the wireless communications network 100 supporting ICN.

The second network node 112 is further configured to, e.g., by means of an initiate sending module 1402 configured to, initiate sending the obtained indication about the one or more network nodes 130 to the first network node 111 configured to operate in the wireless communications network 100.

The first information may be at least one of: the type of the wireless devices, information about users of the wireless devices the history of requests for content from the wireless devices, the contents configured to be requested, the location of the wireless devices, and the mobility patterns of the wireless devices The second network node 112 is further configured to, e.g., by means of a receiving module 1403 configured to, receive, from the third network node 113 configured to operate in the wireless communications network 100, the request for the content from the wireless device 151, the request comprising second information, the second information being configured to be based on the location of the wireless device 151, wherein to obtain the one or more groups is further based on the second information.

The embodiments herein may be implemented through one or more processors, such as a processor 1404 in the second network node 112 depicted in FIG. 14, together with computer program code for performing the functions and actions of the embodiments herein. The program code mentioned above may also be provided as a computer program product, for instance in the form of a data carrier carrying computer program code for performing the embodiments herein when being loaded into the in the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1405 comprising one or more memory units. The memory 1405 is arranged to be used to store obtained information, store data, configurations, schedulings, and applications etc. to perform the methods herein when being executed in the second network node 112.

In some embodiments, the second network node 112 may receive information from the first network node 111, the third network node 113, and/or the wireless device 151, through a receiving port 1406. In some embodiments, the receiving port 1406 may be, for example, connected to one or more antennas in second network node 112. In other embodiments, the second network node 112 may receive information from another structure in the wireless communications network 100 through the receiving port 1406. Since the receiving port 1406 may be in communication with the processor 1404, the receiving port 1406 may then send the received information to the processor 1404. The receiving port 1406 may also be configured to receive other information.

The processor 1404 in the second network node 112 may be further configured to transmit or send information to e.g., the first network node 111, the third network node 113, and/or the wireless device 151, through a sending port 1407, which may be in communication with the processor 1404, and the memory 1405.

Those skilled in the art will also appreciate that the obtaining module 1401, the initiate sending module 1402 and the receiving module 1403 described above may refer to a combination of analog and digital modules, and/or one or more processors configured with software and/or firmware, e.g., stored in memory, that, when executed by the one or more processors such as the processor 1404, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1401-1403 described above may be implemented as one or more applications running on one or more processors such as the processor 1404.

Thus, the methods according to the embodiments described herein for the second network node 112 may be respectively implemented by means of a computer program 1408 product, comprising instructions, i.e., software code portions, which, when executed on at least one processor 1404, cause the at least one processor 1404 to carry out the action described herein, as performed by the second network node 112. The computer program 1408 product may be stored on a computer-readable storage medium 1409. The computer-readable storage medium 1409, having stored thereon the computer program 1408, may comprise instructions which, when executed on at least one processor 1404, cause the at least one processor 1404 to carry out the action described herein, as performed by the second network node 112. In some embodiments, the computer-readable storage medium 1409 may be a non-transitory computer-readable storage medium 1409, such as a CD ROM disc, or a memory stick. In other embodiments, the computer program 1408 product may be stored on a carrier containing the computer program 1408 just described, wherein the carrier is one of an electronic signal, optical signal, radio signal, or the computer-readable storage medium 1409, as described above.

Figure 15:
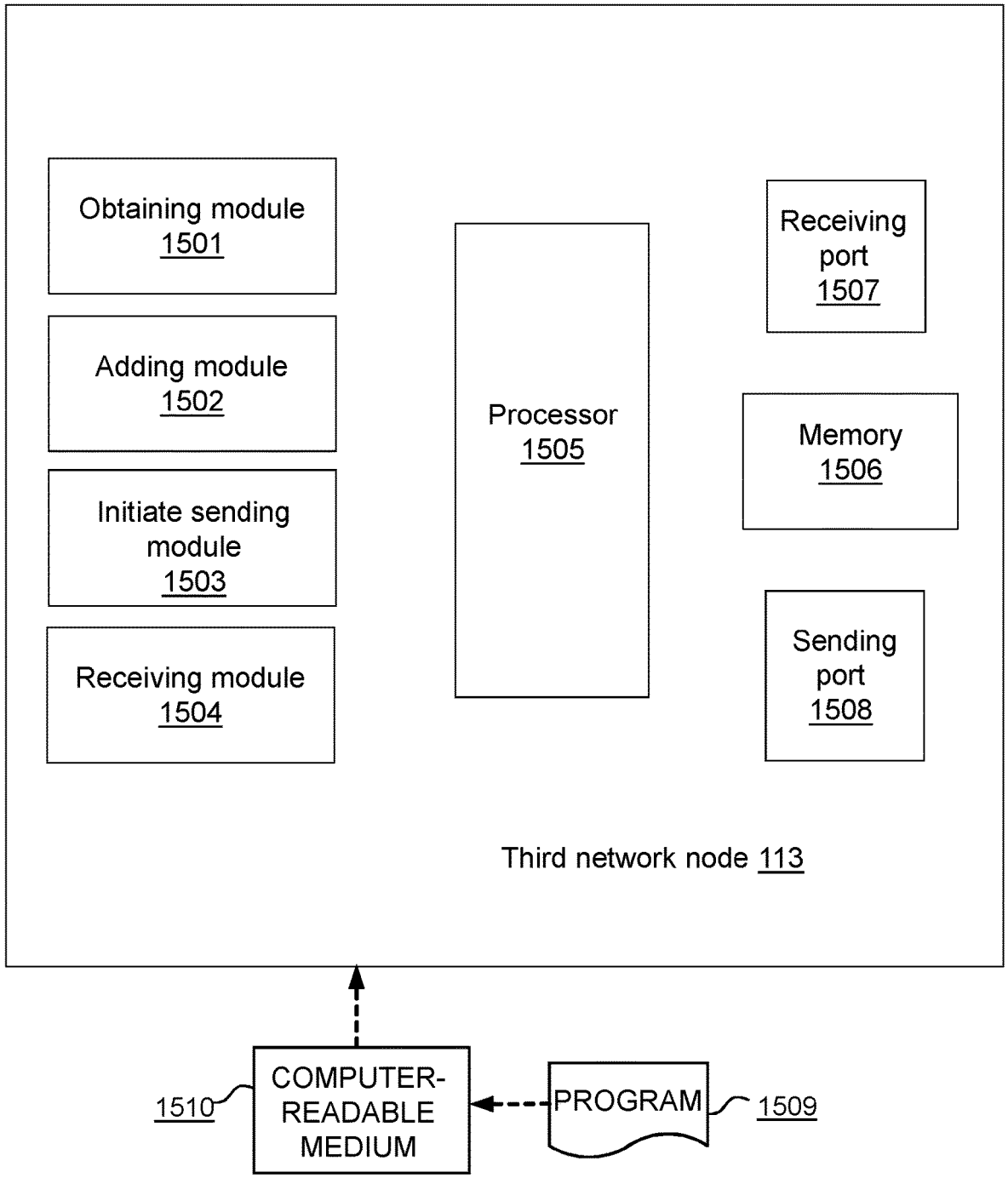
FIG. 15 is a schematic block diagram illustrating embodiments of a third network node, according to embodiments herein.

To perform the method actions described above in relation to FIGS. 7 and 10-12, the third network node 113 for facilitating handling content in an ICN may comprise the following arrangement depicted in FIG. 15. As stated earlier, the third network node 113 is configured to operate in the wireless communications network 100.

The detailed description of some of the following corresponds to the same references provided above, in relation to the actions described for the third network node 113, and will thus not be repeated here. For example, in some embodiments, the third network node 113 may be a MT.

The third network node 113 is configured to, e.g., by means of an obtaining module 1501 configured to, obtain the determination of whether or not the second information is comprised in the request for the content received from the wireless device 151 configured to operate in the wireless communications network 100, the second information being configured to be based on the location of the wireless device 151, and the second information being valid.

The third network node 113 is further configured to, e.g., by means of an adding module 1502 configured to, add valid second information to the request for the content configured to be received from the wireless device 151, wherein the second information is configured to be determined to not be comprised in the request, or wherein the second information comprised in the request is configured to be determined to not be valid.

The third network node 113 is further configured to, e.g., by means of an initiate sending module 1503 configured to, initiate sending the request with the valid second information, to a second network node 112 being configured to operate in the wireless communications network 100.

The third network node 113 may be further configured to, e.g., by means of a receiving module 1504 configured to, receive, from the wireless device 151, the indication about the one or more network nodes 130 where the request for the content by the wireless device 151 is configured to be predicted to be received in the one or more future time periods, the one or more network nodes 130 operating in the wireless communications network 100 supporting ICN.

The embodiments herein may be implemented through one or more processors, such as a processor 1505 in the third network node 113 depicted in FIG. 15, together with computer program code for performing the functions and actions of the embodiments herein. The program code mentioned above may also be provided as a computer program product, for instance in the form of a data carrier carrying computer program code for performing the embodiments herein when being loaded into the in the third network node 113. One such carrier may be in the form of a CD ROM disc. It is however feasible with other data carriers such as a memory stick. The computer program code may furthermore be provided as pure program code on a server and downloaded to the third network node 113.

The third network node 113 may further comprise a memory 1506 comprising one or more memory units. The memory 1506 is arranged to be used to store obtained information, store data, configurations, schedulings, and applications etc. to perform the methods herein when being executed in the third network node 113.

In some embodiments, the third network node 113 may receive information from the first network node 111, the second network node 112, and/or the wireless device 151, through a receiving port 1507. In some embodiments, the receiving port 1507 may be, for example, connected to one or more antennas in third network node 113. In other embodiments, the third network node 113 may receive information from another structure in the wireless communications network 100 through the receiving port 1507. Since the receiving port 1507 may be in communication with the processor 1505, the receiving port 1507 may then send the received information to the processor 1505. The receiving port 1507 may also be configured to receive other information.

The processor 1505 in the third network node 113 may be further configured to transmit or send information to e.g., the first network node 111, the second network node 112, and/or the wireless device 151, through a sending port 1508, which may be in communication with the processor 1505, and the memory 1506.

Those skilled in the art will also appreciate that the obtaining module 1501, the adding module 1502, the initiate sending module 1503 and the receiving module 1504 described above may refer to a combination of analog and digital modules, and/or one or more processors configured with software and/or firmware, e.g., stored in memory, that, when executed by the one or more processors such as the processor 1505, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1501-1504 described above may be implemented as one or more applications running on one or more processors such as the processor 1505.

Thus, the methods according to the embodiments described herein for the third network node 113 may be respectively implemented by means of a computer program 1509 product, comprising instructions, i.e., software code portions, which, when executed on at least one processor 1505, cause the at least one processor 1505 to carry out the action described herein, as performed by the third network node 113. The computer program 1509 product may be stored on a computer-readable storage medium 1510. The computer-readable storage medium 1510, having stored thereon the computer program 1509, may comprise instructions which, when executed on at least one processor 1505, cause the at least one processor 1505 to carry out the action described herein, as performed by the third network node 113. In some embodiments, the computer-readable storage medium 1510 may be a non-transitory computer-readable storage medium 1510, such as a CD ROM disc, or a memory stick. In other embodiments, the computer program 1509 product may be stored on a carrier containing the computer program 1509 just described, wherein the carrier is one of an electronic signal, optical signal, radio signal, or the computer-readable storage medium 1510, as described above.

Figure 16:
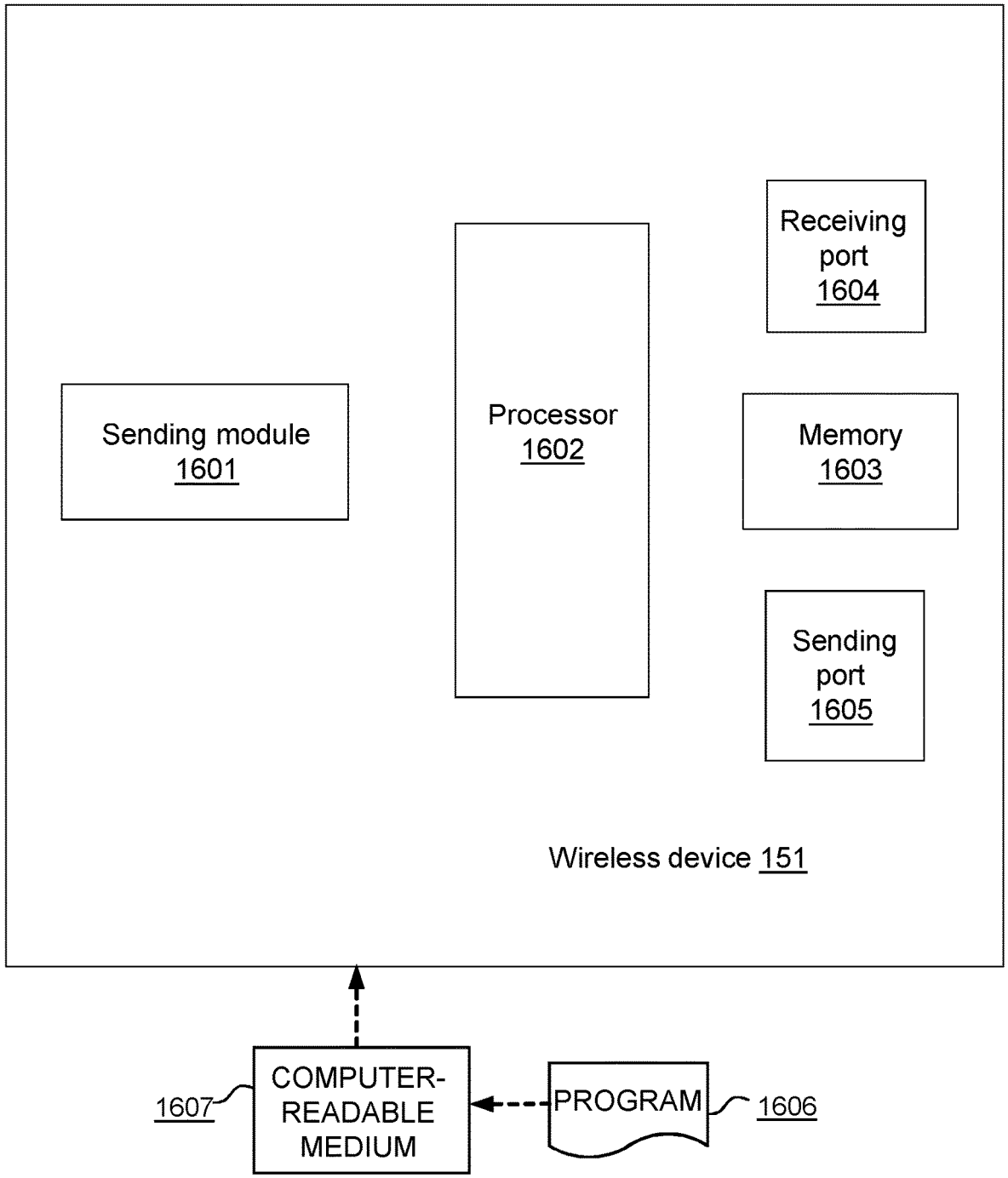
FIG. 16 is a schematic block diagram illustrating embodiments of a wireless device, according to embodiments herein.

To perform the method actions described above in relation to FIGS. 8 and 10-11, the wireless device 151 for facilitating handling content in an ICN may comprise the following arrangement depicted in FIG. 16. As stated earlier, the wireless device 151 is configured to operate in the wireless communications network 100.

The detailed description of some of the following corresponds to the same references provided above, in relation to the actions described for the wireless device 151, and will thus not be repeated here. For example, in some embodiments, the one or more network nodes 130 may be RBSs.

The wireless device 151 is configured to, e.g., by means of a sending module 1601 configured to, send the indication to the network node 111, 112, 113 configured to operate in the wireless communications network 100, the indication being about the one or more network nodes 130 where the request for the content by the wireless device 151 is configured to be predicted to be received in the one or more future time periods, the one or more network nodes 130 being configured to operate in the wireless communications network 100 supporting ICN.

The embodiments herein may be implemented through one or more processors, such as a processor 1602 in the wireless device 151 depicted in FIG. 16, together with computer program code for performing the functions and actions of the embodiments herein. The program code mentioned above may also be provided as a computer program product, for instance in the form of a data carrier carrying computer program code for performing the embodiments herein when being loaded into the in the wireless device 151. One such carrier may be in the form of a CD ROM disc. It is however feasible with other data carriers such as a memory stick. The computer program code may furthermore be provided as pure program code on a server and downloaded to the wireless device 151.

The wireless device 151 may further comprise a memory 1603 comprising one or more memory units. The memory 1603 is arranged to be used to store obtained information, store data, configurations, schedulings, and applications etc. to perform the methods herein when being executed in the wireless device 151.

In some embodiments, the wireless device 151 may receive information from the first network node 111, the second network node 112, the third network node 113, the fourth network node 121 and/or the one or more network nodes 130 through a receiving port 1604. In some embodiments, the receiving port 1604 may be, for example, connected to one or more antennas in wireless device 151. In other embodiments, the wireless device 151 may receive information from another structure in the wireless communications network 100 through the receiving port 1604. Since the receiving port 1604 may be in communication with the processor 1602, the receiving port 1604 may then send the received information to the processor 1602. The receiving port 1604 may also be configured to receive other information.

The processor 1602 in the wireless device 151 may be further configured to transmit or send information to e.g., the first network node 111, the second network node 112, the third network node 113, the fourth network node 121 and/or the one or more network nodes 130, through a sending port 1605, which may be in communication with the processor 1602, and the memory 1603.

Those skilled in the art will also appreciate that the sending module 1601 described above may refer to a combination of analog and digital modules, and/or one or more processors configured with software and/or firmware, e.g., stored in memory, that, when executed by the one or more processors such as the processor 1602, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the sending module 1601 described above may be implemented as one or more applications running on one or more processors such as the processor 1602.

Thus, the methods according to the embodiments described herein for the wireless device 151 may be respectively implemented by means of a computer program 1606 product, comprising instructions, i.e., software code portions, which, when executed on at least one processor 1602, cause the at least one processor 1602 to carry out the action described herein, as performed by the wireless device 151. The computer program 1606 product may be stored on a computer-readable storage medium 1607. The computer-readable storage medium 1607, having stored thereon the computer program 1602, may comprise instructions which, when executed on at least one processor 1602, cause the at least one processor 1602 to carry out the action described herein, as performed by the wireless device 151. In some embodiments, the computer-readable storage medium 1607 may be a non-transitory computer-readable storage medium 1607, such as a CD ROM disc, or a memory stick. In other embodiments, the computer program 1606 product may be stored on a carrier containing the computer program 1606 just described, wherein the carrier is one of an electronic signal, optical signal, radio signal, or the computer-readable storage medium 1607, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method performed by a first network node for handling content in an Information-Centric Network (ICN), the first network node operating in a wireless communications network, the method comprising:
obtaining an indication about one or more network nodes where a request for a content by a wireless device operating in the wireless communications network is predicted to be received in one or more future time periods, the one or more network nodes operating in the wireless communications network supporting ICN, wherein obtaining the indication comprises the first network node predicting that at least a second network node will receive, during at least one of said one or more future time periods, a request for the content transmitted by the wireless device; and
initiating instructing at least a subset of the one or more network nodes to obtain the content prior to the one or more future time periods, wherein the initiating comprises, in response to the first network node predicting that the second network node will receive the request for the content during at least one of said one or more future time periods, the first network node initiating instructing the second network node to obtain the content.

2. The method of claim 1, wherein the prediction is based on at least one of: a type of the wireless device, information about a user of the wireless device, a history of requests for content from the wireless device, the requested content, a location of the wireless device, and a mobility pattern of the wireless device.

3. The method of claim 2, further comprising:
obtaining one or more of: the type of the wireless device, the information about the user of the wireless device, the history of requests for content from the wireless device, the requested content, the location of the wireless device, and the mobility pattern of the wireless device.

4. The method of claim 1, wherein the obtaining the indication about the one or more network nodes is based on one or more groups of wireless devices operating in the wireless communications network, the one or more groups of wireless devices comprising the wireless device, the one or more groups of wireless devices being based on first information about the wireless devices.

5. The method of claim 4, wherein the first information is at least one of: a type of the wireless devices, information about users of the wireless devices, a history of requests for content from the wireless devices, the requested contents, location of the wireless devices, and mobility patterns of the wireless devices.

6. The method of claim 1, wherein the first network node is a radio base station serving the wireless device.

7. A computer program product comprising a non-transitory computer readable medium storing a computer program comprising instructions which, when executed on at least one processor, cause the at least one processor to carry out the method of claim 1.

8. A method performed by a second network node for facilitating handling content in an Information-Centric Network (ICN), the second network node operating in a wireless communications network, the method comprising:
obtaining information indicating that a first wireless device has transmitted a request for content;
determining a group of wireless devices to which the first wireless device belongs;
obtaining an indication about one or more network nodes where a request for a content by a wireless device belonging to the group of wireless devices is predicted to be received in one or more future time periods, the obtaining the indication about the one or more network nodes being based on the determined group and the one or more network nodes operating in the wireless communications network supporting ICN; and
the second network node sending to a first network node operating in the wireless communications network a message identifying the one or more network nodes where a request for a content by a wireless device belonging to the determined group of wireless devices is predicted to be received in one or more future time periods.

9. The method of claim 8, wherein the step of determining the group comprises determining the group based on at least one of: a type of the first wireless device, information about a user of the first wireless device, a history of requests for content from the first wireless device, information about the requested content, or a mobility pattern of the first wireless device.

10. The method of claim 9, further comprising:
receiving, from a third network node operating in the wireless communications network, the request for the content from the wireless device, the request comprising second information, the second information being based on a location of the wireless device, and wherein the step of determining the group is further based on the second information.

11. A computer program product comprising a non-transitory computer readable medium storing a computer program, comprising instructions which, when executed on at least one processor, cause the at least one processor to carry out the method of claim 8.

12. A method performed by a third network node for facilitating handling content in an Information-Centric Network (ICN), the third network node operating in a wireless communications network, the method comprising:
obtaining a determination of whether or not a second information is comprised in a request for a content received from a wireless device operating in the wireless communications network, the second information being based on a location of the wireless device, and the second information being valid,
adding valid second information to the request for the content received from the wireless device wherein the second information is determined to not be comprised in the request, or wherein the second information comprised in the request is determined to not be valid, and
initiating sending the request with the valid second information, to a second network node operating in the wireless communications network.

13. The method of claim 12, further comprising:
receiving, from the wireless device, an indication about one or more network nodes where a request for a content by the wireless device is predicted to be received in one or more future time periods, the one or more network nodes operating in the wireless communications network supporting ICN.

14. A computer program product comprising a non-transitory computer readable medium storing a computer program, comprising instructions which, when executed on at least one processor, cause the at least one processor to carry out the method of claim 12.

15. A first network node for handling content in an Information-Centric Network (ICN), the first network node being configured to operate in a wireless communications network, the first network node being further configured to perform the method of claim 1.

16. A second network node for facilitating handling content in an Information-Centric Network (ICN), the second network node being configured to operate in a wireless communications network, the second network node being further configured to perform the method of claim 8.

17. A third network node for facilitating handling content in an Information-Centric Network (ICN), the third network node being configured to operate in a wireless communications network, the third network node being further configured to perform the method of claim 12.

* * * * *